(12) United States Patent
Lemmey et al.

(10) Patent No.: US 9,557,817 B2
(45) Date of Patent: Jan. 31, 2017

(54) RECOGNIZING GESTURE INPUTS USING DISTRIBUTED PROCESSING OF SENSOR DATA FROM MULTIPLE SENSORS

(75) Inventors: Tara Lemmey, San Francisco, CA (US); Stanislav Vonog, San Francisco, CA (US); Nikolay Surin, San Francisco, CA (US)

(73) Assignee: Wickr Inc., San Francisco, CA (US)

( * ) Notice: Subject to any disclaimer, the term of this patent is extended or adjusted under 35 U.S.C. 154(b) by 823 days.

(21) Appl. No.: 13/210,370

(22) Filed: Aug. 15, 2011

(65) Prior Publication Data

US 2012/0038550 A1 Feb. 16, 2012

Related U.S. Application Data

(60) Provisional application No. 61/373,339, filed on Aug. 13, 2010, provisional application No. 61/482,968, (Continued)

(51) Int. Cl.
*G06F 3/01* (2006.01)
*A63F 13/355* (2014.01)
(Continued)

(52) U.S. Cl.
CPC .............. *G06F 3/017* (2013.01); *A63F 13/355* (2014.09); *A63F 13/42* (2014.09); *G06F 3/0346* (2013.01);
(Continued)

(58) Field of Classification Search
CPC ...... G06F 3/017; G06F 3/0346; A63F 13/355; A63F 13/42; A63F 13/213; A63F 13/211; A63F 13/217; H04L 67/38
See application file for complete search history.

(56) References Cited

U.S. PATENT DOCUMENTS 5,491,743 A 2/1996 Shiio et al.
6,144,991 A 11/2000 England
(Continued)

FOREIGN PATENT DOCUMENTS

JP 2010-016662 A 1/2010
KR 10-2002-0038738 A 5/2002
(Continued)

OTHER PUBLICATIONS

Ettin, Scott A.; "Band of the Hand: Handheld Media Platforms from Palm OS to Pocket PC Pose New Challenges to Video Producers, But They Also Present New Opportunities"; Emedia, The Digital Studio Magazine; 16, 1, 44(2) (Jan. 2003).
(Continued)

*Primary Examiner* — Adam R Giesy
*Assistant Examiner* — Karin Kiyabu
(74) *Attorney, Agent, or Firm* — Perkins Coie LLP

(57) ABSTRACT

The techniques discussed herein contemplate methods and systems for providing, for example, interactive virtual experiences that are initiated or controlled using user gestures. In embodiments, the techniques provide for gestures performed by users holding devices to be recognized and processed in a cloud computing environment such that the gestures produce a predefined desired result. According to one embodiment, a server communicates with a first device in a cloud computing environment, wherein the first device can detect surrounding devices, and an application program is executable by the server, wherein the application program is controlled by the first device and the output of the application program is directed by the server to one of the devices detected by the first device.

29 Claims, 28 Drawing Sheets

Public Experience Computing Environments

Related U.S. Application Data filed on May 5, 2011, provisional application No. 61/499,567, filed on Jun. 21, 2011.

(51) Int. Cl.
   | | |
   |---|---|
   | *A63F 13/42* | (2014.01) |
   | *H04L 29/06* | (2006.01) |
   | *G06F 3/0346* | (2013.01) |
   | *A63F 13/213* | (2014.01) |
   | *A63F 13/211* | (2014.01) |
   | *A63F 13/217* | (2014.01) |

(52) U.S. Cl.
   CPC .............. *H04L 67/38* (2013.01); *A63F 13/211* (2014.09); *A63F 13/213* (2014.09); *A63F 13/217* (2014.09); *A63F 2300/1012* (2013.01); *A63F 2300/6045* (2013.01)

(56) References Cited

U.S. PATENT DOCUMENTS

| | | |
|---|---|---|
| 7,171,485 B2 | 1/2007 | Roach et al. |
| 7,351,149 B1 | 4/2008 | Simon et al. |
| 7,516,255 B1 | 4/2009 | Hobbs |
| 7,529,259 B2 | 5/2009 | Van Acker et al. |
| 7,760,640 B2 | 7/2010 | Brown et al. |
| 8,132,111 B2 | 3/2012 | Baron et al. |
| 8,150,757 B1 | 4/2012 | Sieffert et al. |
| 8,171,154 B2 | 5/2012 | Vonog et al. |
| 8,234,398 B2 | 7/2012 | Vonog et al. |
| 8,255,552 B2 | 8/2012 | Witt et al. |
| 8,429,704 B2 | 4/2013 | Vonog et al. |
| 8,463,677 B2 | 6/2013 | Vonog et al. |
| 8,759,121 B2 | 6/2014 | Hung et al. |
| 8,789,121 B2 | 7/2014 | Lemmey et al. |
| 2002/0051493 A1 | 5/2002 | Shin et al. |
| 2003/0074474 A1 | 4/2003 | Roach et al. |
| 2003/0074554 A1 | 4/2003 | Roach et al. |
| 2003/0188320 A1 | 10/2003 | Shing |
| 2003/0217170 A1 | 11/2003 | Nelson et al. |
| 2004/0128350 A1 | 7/2004 | Topfl et al. |
| 2005/0007965 A1 | 1/2005 | Hagen |
| 2005/0100100 A1 | 5/2005 | Unger |
| 2006/0183547 A1 | 8/2006 | McMonigle |
| 2007/0094691 A1 | 4/2007 | Gazdzinski et al. |
| 2007/0217436 A1 | 9/2007 | Markley et al. |
| 2007/0271580 A1 | 11/2007 | Tischer et al. |
| 2008/0004888 A1 | 1/2008 | Davis |
| 2008/0039205 A1 | 2/2008 | Ackley et al. |
| 2008/0056718 A1 | 3/2008 | Parker et al. |
| 2008/0064490 A1 | 3/2008 | Ellis |
| 2008/0068449 A1 | 3/2008 | Wu et al. |
| 2008/0079724 A1* | 4/2008 | Isard .................. G06T 11/206 345/440 |
| 2008/0134235 A1 | 6/2008 | Kalaboukis |
| 2008/0139301 A1 | 6/2008 | Holthe |
| 2008/0158373 A1 | 7/2008 | Chu |
| 2008/0181260 A1 | 7/2008 | Vonog et al. |
| 2008/0195744 A1 | 8/2008 | Bowra |
| 2008/0195956 A1 | 8/2008 | Baron et al. |
| 2008/0205426 A1 | 8/2008 | Grover et al. |
| 2008/0267447 A1* | 10/2008 | Kelusky et al. .............. 382/100 |
| 2009/0013263 A1 | 1/2009 | Fortnow et al. |
| 2009/0046139 A1 | 2/2009 | Cutler et al. |
| 2009/0100452 A1 | 4/2009 | Hudgeons et al. |
| 2009/0115843 A1 | 5/2009 | Sohmers |
| 2009/0118017 A1 | 5/2009 | Perlman et al. |
| 2009/0164995 A1* | 6/2009 | Waris .................. G06F 9/5055 718/100 |
| 2009/0183205 A1 | 7/2009 | McCartie et al. |
| 2009/0186700 A1 | 7/2009 | Konkle |
| 2009/0239587 A1 | 9/2009 | Negron et al. |
| 2009/0309846 A1 | 12/2009 | Trachtenberg et al. |
| 2010/0004977 A1 | 1/2010 | Marci et al. |
| 2010/0113140 A1 | 5/2010 | Kelly et al. |
| 2010/0149096 A1 | 6/2010 | Migos et al. |
| 2010/0156812 A1 | 6/2010 | Stallings et al. |
| 2010/0185514 A1 | 7/2010 | Glazer |
| 2010/0191859 A1 | 7/2010 | Raveendran et al. |
| 2010/0268843 A1 | 10/2010 | Van Wie et al. |
| 2010/0278508 A1 | 11/2010 | Aggarwal |
| 2011/0046980 A1 | 2/2011 | Metzler et al. |
| 2011/0078532 A1* | 3/2011 | Vonog .................. G06F 3/1454 714/752 |
| 2011/0103374 A1 | 5/2011 | Lajoie et al. |
| 2011/0116540 A1 | 5/2011 | O'Connor et al. |
| 2011/0145817 A1 | 6/2011 | Grzybowski |
| 2011/0151976 A1* | 6/2011 | Holloway et al. .............. 463/42 |
| 2011/0163944 A1 | 7/2011 | Bilbrey et al. |
| 2011/0173247 A1* | 7/2011 | Hubbard ................ G06Q 30/02 709/203 |
| 2011/0175822 A1 | 7/2011 | Poon et al. |
| 2011/0209089 A1* | 8/2011 | Hinckley et al. ............. 715/810 |
| 2011/0225515 A1 | 9/2011 | Goldman et al. |
| 2011/0244954 A1 | 10/2011 | Goldman et al. |
| 2011/0246908 A1 | 10/2011 | Akram et al. |
| 2011/0271208 A1 | 11/2011 | Jones et al. |
| 2011/0292181 A1* | 12/2011 | Acharya et al. ................. 348/47 |
| 2011/0298827 A1* | 12/2011 | Perez ............................ 345/647 |
| 2011/0302532 A1 | 12/2011 | Missig |
| 2012/0039382 A1 | 2/2012 | Vonog et al. |
| 2012/0041859 A1 | 2/2012 | Vonog et al. |
| 2012/0041869 A1 | 2/2012 | Glodjo et al. |
| 2012/0060101 A1 | 3/2012 | Vonog et al. |
| 2012/0078788 A1 | 3/2012 | Gandhi |
| 2012/0082226 A1 | 4/2012 | Weber |
| 2012/0084738 A1 | 4/2012 | Sirpal |
| 2012/0127100 A1 | 5/2012 | Forte et al. |
| 2012/0131458 A1 | 5/2012 | Hayes |
| 2012/0134409 A1 | 5/2012 | Vonog et al. |
| 2012/0151541 A1 | 6/2012 | Vonog et al. |
| 2012/0191586 A1 | 7/2012 | Vonog et al. |
| 2012/0206262 A1 | 8/2012 | Grasso |
| 2012/0206558 A1 | 8/2012 | Setton |
| 2012/0206560 A1 | 8/2012 | Setton |
| 2012/0272162 A1 | 10/2012 | Surin et al. |
| 2013/0019184 A1 | 1/2013 | Vonog et al. |
| 2013/0050080 A1 | 2/2013 | Dahl et al. |
| 2013/0156093 A1 | 6/2013 | Vonog et al. |
| 2013/0238535 A1* | 9/2013 | Leppanen ............ G06N 99/005 706/12 |
| 2013/0339222 A1 | 12/2013 | Vonog et al. |
| 2016/0219279 A1 | 7/2016 | Vonog et al. |

FOREIGN PATENT DOCUMENTS

| | | |
|---|---|---|
| KR | 10-2006-0062381 A | 6/2006 |
| KR | 2006-0083034 A | 7/2006 |
| KR | 10-2008-0008340 A | 1/2008 |
| KR | 10-2009-0113158 A | 10/2009 |
| KR | 10-2010-0098668 A | 9/2010 |
| WO | WO-02-41121 A2 | 5/2002 |
| WO | WO 2007084994 | 7/2007 |
| WO | WO-/2008/072923 A1 | 6/2008 |

OTHER PUBLICATIONS

Moote, et al.; "Moving Toward a Dual-Infrastructure Facility"; Broadcast Engineering; vol. 46, No. 9, pp. 72-78 (Sep. 2004).

"Broadcom Announces Industry's Most Advanced High Definition AVC Encoder/Transcoder that Transforms the PC into a Multimedia Server"; PR Newswire (Jan. 7, 2008).

Notice of Allowance mailed Sep. 4, 2013, in Co-Pending U.S. Appl. No. 13/367,146 of Vonog, S., et al., filed Feb. 6, 2012.

Final Office Action mailed Aug. 15, 2013, in Co-Pending U.S. Appl. No. 13/221,801 of Vonog, S., et al., filed Aug. 30, 2011.

Co-Pending U.S. Appl. No. 13/762,149 of Vonog, S., filed Feb. 7, 2013.

Notice of Allowance mailed Apr. 3, 2013, in Co-Pending U.S. Appl. No. 13/163,869, filed Sep. 7, 2012.

Non-Final Office Action mailed Mar. 19, 2013, in Co-Pending U.S. Appl. No. 13/367,146, filed Feb. 6, 2012.

(56) References Cited

OTHER PUBLICATIONS

Non-Final Office Action mailed Apr. 1, 2013, in Co-Pending U.S. Appl. No. 13/221,801, filed Aug. 30, 2011.
Co-Pending U.S. Appl. No. 13/136,869 of Vonog, S., et al., filed Aug. 12, 2011.
Co-Pending U.S. Appl. No. 13/136,870 of Vonog, S., et al., filed Aug. 12, 2011.
Co-Pending U.S. Appl. No. 13/221,801 of Vonog, S., et al., filed Aug. 30, 2011.
Co-Pending U.S. Appl. No. 13/363,187 of Vonog, S., et al., filed Jan. 31, 2012.
Co-Pending U.S. Appl. No. 13/367,146 of Vonog, S., et al., filed Feb. 6, 2012.
International Search Report PCT/US2011/001424 dated Apr. 6, 2012, pp. 1-3.
International Search Report PCT/US2011/001425 dated Apr. 6, 2012, pp. 1-3.
International Search Report PCT/US2011/047814 dated Apr. 9, 2012, pp. 1-3.
International Search Report PCT/US2011/047815 dated Apr. 9, 2012, pp. 1-3.
Written Opinion PCT/US2011/001424 dated Apr. 6, 2012, pp. 1-3.
Written Opinion PCT/US2011/001425 dated Apr. 6, 2012, pp. 1-3.
Written Opinion PCT/US2011/047814 dated Apr. 9, 2012, pp. 1-5.
Written Opinion PCT/US2011/047815 dated Apr. 9, 2012, pp. 1-4.
International Search Report mailed May 16, 2012 of PCT Application No. PCT/US2011/057385, 9 pages.
Written Opinion mailed May 16, 2012 of PCT Application No. PCT/US2011/057385, 4 pages.
Co-Pending U.S. Appl. No. 13/279,096 of Vonog, S., et al., filed Oct. 21, 2011.
Co-Pending U.S. Appl. No. 13/461,680 of Vonog, S., et al., filed May 1, 2012.
Co-Pending U.S. Appl. No. 13/546,906 of Vonog, S., et al., filed Jul. 11, 2012.
Co-Pending U.S. Appl. No. 13/694,582, filed Dec. 12, 2012.
Co-Pending U.S. Appl. No. 13/694,581, filed Dec. 12, 2012.
Non-Final Office Action mailed Sep. 11, 2012, in Co-Pending U.S. Appl. No. 13/136,869, filed Sep. 7, 2012.
Notice of Allowance mailed Feb. 4, 2013, in Co-Pending U.S. Appl. No. 13/279,096, filed Oct. 21, 2011.
Non-Final Office Action of U.S. Appl. No. 13/874,319 with a mailing date of Jan. 6, 2014.
Final Office Action of U.S. Appl. No. 13/874,319 with a mailing date of Jan. 6, 2014.
Non-Final Office Action mailed Jul. 9, 2014, in Co-Pending U.S. Appl. No. 13/461,680 with a filing date of May 1, 2012.
Non-Final Office Action mailed Aug. 15, 2014, in Co-Pending U.S. Appl. No. 13/221,801 of Vonog, S., et al., filed Aug. 30, 2011.
Ghezzi, et al. "Mobile Content and Service Delivery Platforms: A Technology Classification Model"; Info: the Journal of Policy, Regulation and Strategy for Telecommunications, Information and Media; vol. 14, No. 2, pp. 72-88 (2012).
Radvision to Bring Scalable Video Coding (SVC) Technology to SCOPIA Conferencing Platform Business Wire, pp. 1-2, Apr. 21, 2009.
Wen Bin Kwan, "Personalized Multimedia News Agents in a Broadband Environment"; Ottawa-Carleton Institute of Electrical Engineering (Sep. 1996).
Non-Final Office Action mailed Jan. 16, 2014, for U.S. Appl. No. 13/136,870 of Vonog, S., et al., filed Aug. 12, 2011.
Final Office Action mailed Nov. 6, 2014, for U.S. Appl. No. 13/136,870 of Vonog, S., et al., filed Aug. 12, 2011.
Notice of Allowance mailed Jun. 19, 2015, for U.S. Appl. No. 13/136,870 of Vonog, S., et al., filed Aug. 12, 2011.
Notice of Allowance mailed Mar. 18, 2013, in U.S. Appl. No. 13/279,096 of Vonog, S., et al., filed Oct. 21, 2011.
Notice of Allowance mailed Oct. 23, 2013, U.S. Appl. No. 13/762,149 of Vonog. S., filed Feb. 7, 2013.
Notice of Allowance mailed Dec. 5, 2013, U.S. Appl. No. 13/762,149 of Vonog. S., filed Feb. 7, 2013.
Notice of Allowance mailed Mar. 14, 2014, U.S. Appl. No. 13/762,149 of Vonog. S., filed Feb. 7, 2013.
Non-Final Office Action mailed Feb. 26, 2015, in U.S. Appl. No. 13/461,680 with a filing date of May 1, 2012.
Restriction Requirement mailed on Sep. 24, 2013, for U.S. Appl. No. 13/694,582 of Lemmey, T., et al., filed Dec. 12, 2012.
Restriction Requirement mailed on Apr. 21, 2014, for U.S. Appl. No. 13/694,582 of Lemmey, T., et al., filed Dec. 12, 2012.
Non-Final Office Action mailed on Mar. 31, 2015, for U.S. Appl. No. 13/694,582 of Lemmey, T., et al., filed Dec. 12, 2012.
Non-Final Office Action mailed Oct. 29, 2014, for U.S. Appl. No. 13/694,581 of Vonog, S., et al., filed Dec. 12, 2012.
Notice of Allowance mailed Oct. 3, 2014, for U.S. Appl. No. 13/874,319, filed Apr. 30, 2013.
Final Office Action mailed Aug. 15, 2013, in U.S. Appl. No. 13/221,801 of Vonog, S., et al., filed Aug. 30, 2011.
Non-Final Office Action mailed Dec. 4, 2014, for U.S. Appl. No. 13/363,187 of Vonog, S., et al., filed Aug. 12, 2011.
Non-Final Office Action mailed May 13, 2016, for U.S. Appl. No. 15/087,657 of Vonog, S., et al., filed Mar. 31, 2016.
U.S. Appl. No. 12/569,876 of Vonog, S., et al., filed Sep. 29, 2009.

* cited by examiner

Gestural Communication
Human → Machine
Fig. 16A
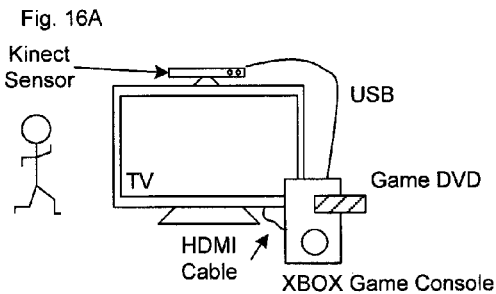
Fig. 16X
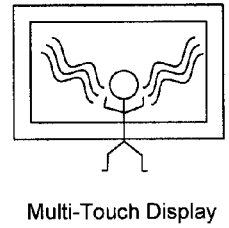
Multi-Touch Display
Fig. 16B
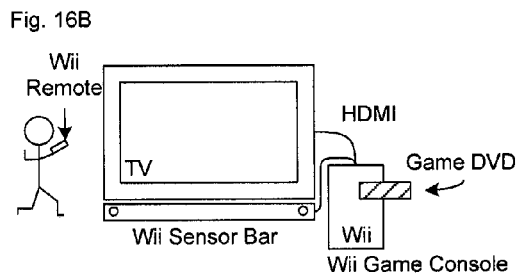
Fig. 16Y
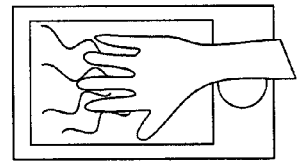
Multi-Touch Tablet
Fig. 16C
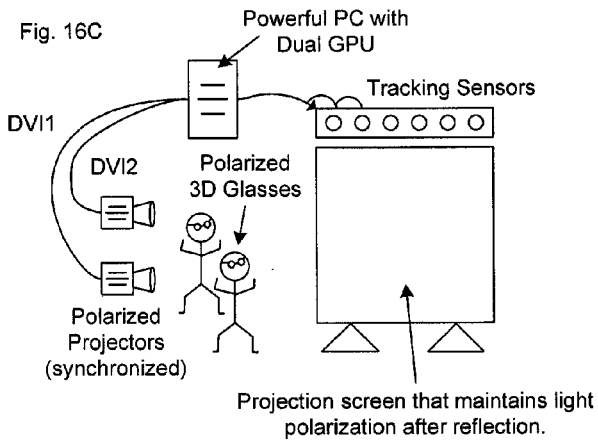
Fig. 16Z
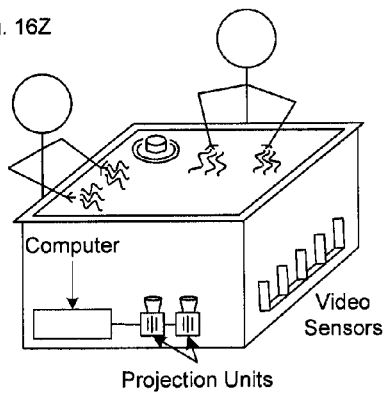
Multi-Touch Back Projection Table
Prior Art
*FIG. 16*

GESTURAL COMMUNICATION
HUMAN ⟶ HUMAN
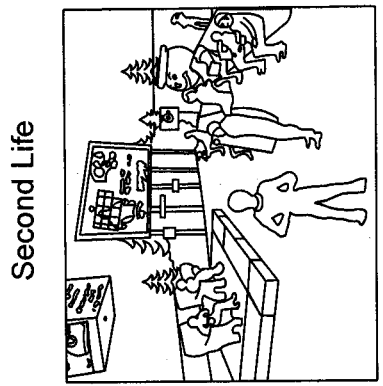
Second Life
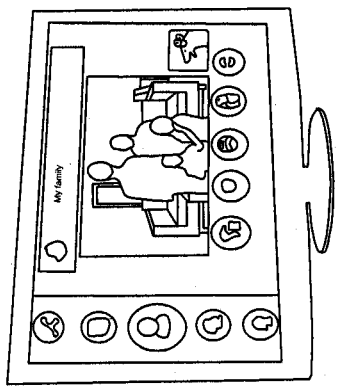
Skype
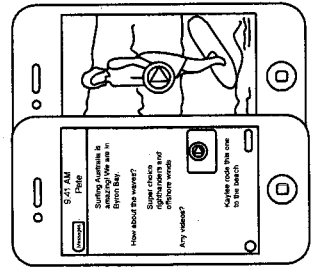
MMS
PRIOR ART
*FIG. 17*

US 9,557,817 B2

RECOGNIZING GESTURE INPUTS USING DISTRIBUTED PROCESSING OF SENSOR DATA FROM MULTIPLE SENSORS

CLAIM OF PRIORITY AND RELATED APPLICATIONS

This application claims priority to the following U.S. Provisional patent applications, each of which is incorporated in its entirety by this reference:

U.S. Provisional Patent Application No. 61/373,339, entitled METHOD AND SYSTEM FOR DEVICE INTERACTION THROUGH GESTURES, filed Aug. 13, 2010;

U.S. Provisional Patent Application No. 61/482,968, entitled IDENTIFYING GESTURES USING MULTIPLE SENSORS, filed May 5, 2011;

U.S. Provisional Patent Application No. 61/499,567, entitled METHOD AND SYSTEM FOR APPLAUSE EVENTS WITH SWELL, DIMINISH, AND SOCIAL ASPECTS, filed Jun. 21, 2011.

This application is related to the following U.S. patent applications, each of which is incorporated in its entirety by this reference:

U.S. patent application Ser. No. 13/136,869, issued as U.S. Pat. No. 8,463,677, entitled SYSTEM ARCHITECTURE AND METHODS FOR EXPERIENTIAL COMPUTING, filed Aug. 12, 2011;

U.S. patent application Ser. No. 13/136,870, issued as U.S. Pat. No. 9,172,979, entitled EXPERIENCE OR "SENTIO" CODECS, AND METHODS AND SYSTEMS FOR IMPROVING QOE AND ENCODING BASED ON QOE FOR EXPERIENCES, filed Aug. 12, 2011;

U.S. patent application Ser. No. 13/210,364, entitled METHODS AND SYSTEMS FOR VIRTUAL EXPERIENCES, filed concurrently herewith.

FIELD

The present teaching relates to network communications and more specifically to methods and systems for facilitating interaction through gestures in for example, collaborative platforms.

is a device that allows wired communication devices to connect to a wireless network using Wi-Fi, Bluetooth or related standards. The WAP usually connects to a router, and can relay data between the wireless devices (such as computers or printers) and wired devices on the network. Data is transmitted over the wireless network using email or other file transfer mechanism. Although devices are connected within hundreds of thousands of private local networks or as part of the Internet, the devices are largely unaware of each other. Transferring and synchronizing data between them is often a long and painful task.

A gesture is a form of non-verbal communication in which visible bodily actions communicate particular messages, either in place of speech or together and in parallel with spoken words. Gestures include movement of the hands, face, or other parts of the body. Gestures differ from physical non-verbal communication that does not communicate specific messages, such as purely expressive displays, proxemics, or displays of joint attention. Gestures allow individuals to communicate a variety of feelings and thoughts, from contempt and hostility to approval and affection, often together with body language in addition to words when they speak.

SUMMARY

According to one embodiment, the present system, a "gesture paradigm," provides for gestures performed by users holding devices to be recognized and processed in a cloud computing environment such that the gestures produce a predefined desired result. According to one embodiment, a server communicates with a first device in a cloud computing environment, wherein the first device can detect surrounding devices, and an application program is executable by the server, wherein the application program is controlled by the first device and the output of the application program is directed by the server to one of the devices detected by the first device. According to one embodiment, devices have a variety of input and output capabilities, depending on hardware and enabled features of the devices. Examples of detection for input include but are not limited to accelerometers, gyrometers, motion detection in general, video recognition, voice recognition, multi-touch, the ability to sense breath or air as an input, barometer, wireless communication and a thermometer. Output capabilities include yet are not limited to audio, video, vibration, and wireless communication. The combinations of the device input capabilities enable device users to act out gestures as input and affect some predefined output or result that is associated with the gesture input. Gestures are sensed as input from the device to the cloud, and processed in the cloud or optionally on the device, and a desired output is produced as a result.

Other advantages and features will become apparent from the following description and claims. It should be understood that the description and specific examples are intended for purposes of illustration only and not intended to limit the scope of the present disclosure.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

FIG. 16 illustrates additional prior art examples of human to machine gestural communications;

FIG. 17 illustrates additional prior art examples of human to human gestural communications;

DETAILED DESCRIPTION OF THE INVENTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Figure 1:
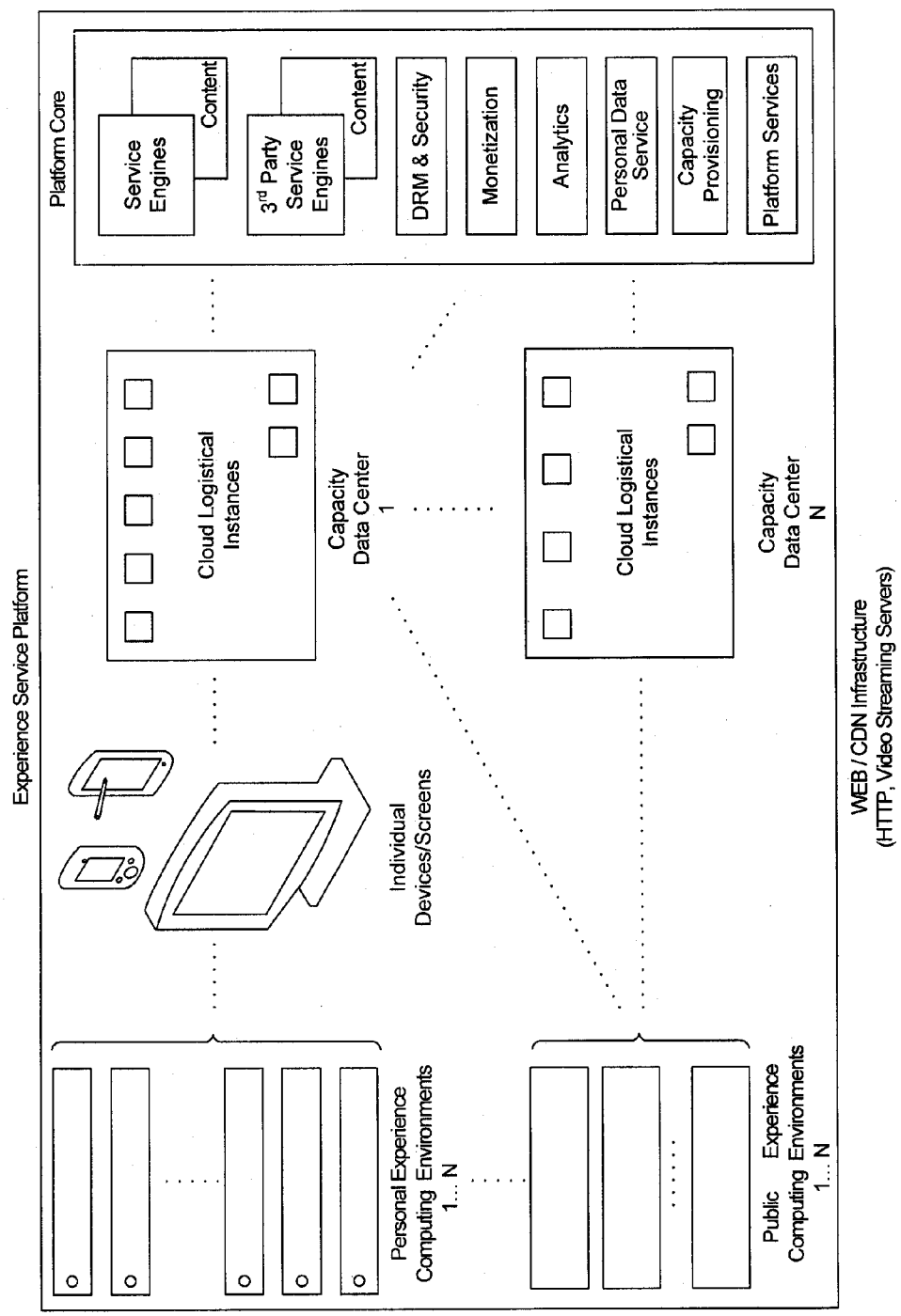
FIG. 1 illustrates a system architecture for composing and directing user experiences.

FIG. 1 illustrates an exemplary embodiment of a system environment that may be used for practicing the techniques discussed herein. The environment can be viewed as an "experience platform" or system architecture for composing and directing a participant experience. In one embodiment, the experience platform 10 is provided by a service provider to enable an experience provider to compose and direct a participant experience. The participant experience can involve one or more experience participants. The experience provider can create an experience with a variety of dimensions, as will be explained further now. As will be appreciated, the following description provides one paradigm for understanding the multi-dimensional experience available to the participants. There are many suitable ways of describing, characterizing and implementing the experience platform contemplated herein.

Some of the attributes of "experiential computing" offered through, for example, such an experience platform are: 1) pervasive—it assumes multi-screen, multi-device, multi-sensor computing environments both personal and public; this is in contrast to "personal computing" paradigm where computing is defined as one person interacting with one device (such as a laptop or phone) at any given time; 2) the applications focus on invoking feelings and emotions as opposed to consuming and finding information or data processing; 3) multiple dimensions of input and sensor data—such as physicality; 4) people connected together—live, synchronously: multi-person social real-time interaction allowing multiple people interact with each other live using voice, video, gestures and other types of input.

The experience platform may be provided by a service provider to enable an experience provider to compose and direct a participant experience. The service provider monetizes the experience by charging the experience provider and/or the participants for services. The participant experience can involve one or more experience participants. The experience provider can create an experience with a variety of dimensions and features. As will be appreciated, the following description provides one paradigm for understanding the multi-dimensional experience available to the participants. There are many suitable ways of describing, characterizing and implementing the experience platform contemplated herein.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

In general, services are defined at an API layer of the experience platform. The services are categorized into "dimensions." The dimension(s) can be recombined into "layers." The layers form to make features in the experience.

By way of example, the following are some of the dimensions that can be supported on the experience platform.

Video—is the near or substantially real-time streaming of the video portion of a video or film with near real-time display and interaction.

Audio—is the near or substantially real-time streaming of the audio portion of a video, film, karaoke track, song, with near real-time sound and interaction.

Live—is the live display and/or access to a live video, film, or audio stream in near real-time that can be controlled by another experience dimension. A live display is not limited to single data stream.

Encore—is the replaying of a live video, film or audio content. This replaying can be the raw version as it was originally experienced, or some type of augmented version that has been edited, remixed, etc.

Graphics—is a display that contains graphic elements such as text, illustration, photos, freehand geometry and the attributes (size, color, location) associated with these elements. Graphics can be created and controlled using the experience input/output command dimension(s) (see below).

Input/Output Command(s)—are the ability to control the video, audio, picture, display, sound or interactions with human or device-based controls. Some examples of input/output commands include physical gestures or movements, voice/sound recognition, and keyboard or smart-phone device input(s).

Interaction—is how devices and participants interchange and respond with each other and with the content (user experience, video, graphics, audio, images, etc.) displayed in an experience. Interaction can include the defined behavior of an artifact or system and the responses provided to the user and/or player.

Game Mechanics—are rule-based system(s) that facilitate and encourage players to explore the properties of an experience space and other participants through the use of feedback mechanisms. Some services on the experience Platform that could support the game mechanics dimensions include leader boards, polling, like/dislike, featured players, star-ratings, bidding, rewarding, role-playing, problem-solving, etc.

Ensemble—is the interaction of several separate but often related parts of video, song, picture, story line, players, etc. that when woven together create a more engaging and immersive experience than if experienced in isolation.

Auto Tune—is the near real-time correction of pitch in vocal and/or instrumental performances. Auto Tune is used to disguise off-key inaccuracies and mistakes, and allows singer/players to hear back perfectly tuned vocal tracks without the need of singing in tune.

Auto Filter—is the near real-time augmentation of vocal and/or instrumental performances. Types of augmentation could include speeding up or slowing down the playback, increasing/decreasing the volume or pitch, or applying a celebrity-style filter to an audio track (like a Lady Gaga or Heavy-Metal filter).

Remix—is the near real-time creation of an alternative version of a song, track, video, image, etc. made from an original version or multiple original versions of songs, tracks, videos, images, etc.

Viewing 360°/Panning—is the near real-time viewing of the 360° horizontal movement of a streaming video feed on a fixed axis. Also the ability to for the player(s) to control and/or display alternative video or camera feeds from any point designated on this fixed axis.

Turning back to FIG. 1, the exemplary experience platform includes a plurality of personal experience computing environments, each of which includes one or more individual devices and a capacity data center. The devices may include, for example, devices such as an iPhone, an android, a set top box, a desktop computer, a netbook, or other such computing devices. At least some of the devices may be located in proximity with each other and coupled via a wireless network. In certain embodiments, a participant utilizes multiple devices to enjoy a heterogeneous experience, such as, for example, using the iPhone to control operation of the other devices. Participants may, for example, view a video feed in one device (e.g., an iPhone) and switch the feed to another device (e.g., a netbook) to switch the feed to a larger display device. In other examples, multiple participants may also share devices at one location, or the devices may be distributed across various locations for different participants.

Each device or server has an experience agent. In some embodiments, the experience agent includes a sentio codec and an API. The sentio codec and the API enable the experience agent to communicate with and request services of the components of the data center. In some instances, the experience agent facilitates direct interaction between other local devices. Because of the multi-dimensional aspect of the experience, in at least some embodiments, the sentio codec and API are required to fully enable the desired experience. However, the functionality of the experience agent is typically tailored to the needs and capabilities of the specific device on which the experience agent is instantiated. In some embodiments, services implementing experience dimensions are implemented in a distributed manner across the devices and the data center. In other embodiments, the devices have a very thin experience agent with little functionality beyond a minimum API and sentio codec, and the bulk of the services and thus composition and direction of the experience are implemented within the data center. The experience agent is further illustrated and discussed in FIG. 6.

The experience platform further includes a platform core that provides the various functionalities and core mechanisms for providing various services. In embodiments, the platform core may include service engines, which in turn are responsible for content (e.g., to provide or host content) transmitted to the various devices. The service engines may be endemic to the platform provider or may include third party service engines. The platform core also, in embodiments, includes monetization engines for performing various monetization objectives. Monetization of the service platform can be accomplished in a variety of manners. For example, the monetization engine may determine how and when to charge the experience provider for use of the services, as well as tracking for payment to third-parties for use of services from the third-party service engines. Additionally, in embodiments, the service platform may also include capacity provisioning engines to ensure provisioning of processing capacity for various activities (e.g., layer generation, etc.). The service platform (or, in instances, the platform core) may include one or more of the following: a plurality of service engines, third party service engines, etc. In some embodiments, each service engine has a unique, corresponding experience agent. In other embodiments, a single experience can support multiple service engines. The service engines and the monetization engines can be instantiated on one server, or can be distributed across multiple servers. The service engines correspond to engines generated by the service provider and can provide services such as audio remixing, gesture recognition, and other services referred to in the context of dimensions above, etc. Third party service engines are services included in the service platform by other parties. The service platform may have the third-party service engines instantiated directly therein, or within the service platform 46 these may correspond to proxies which in turn make calls to servers under control of the third-parties.

Figure 2:
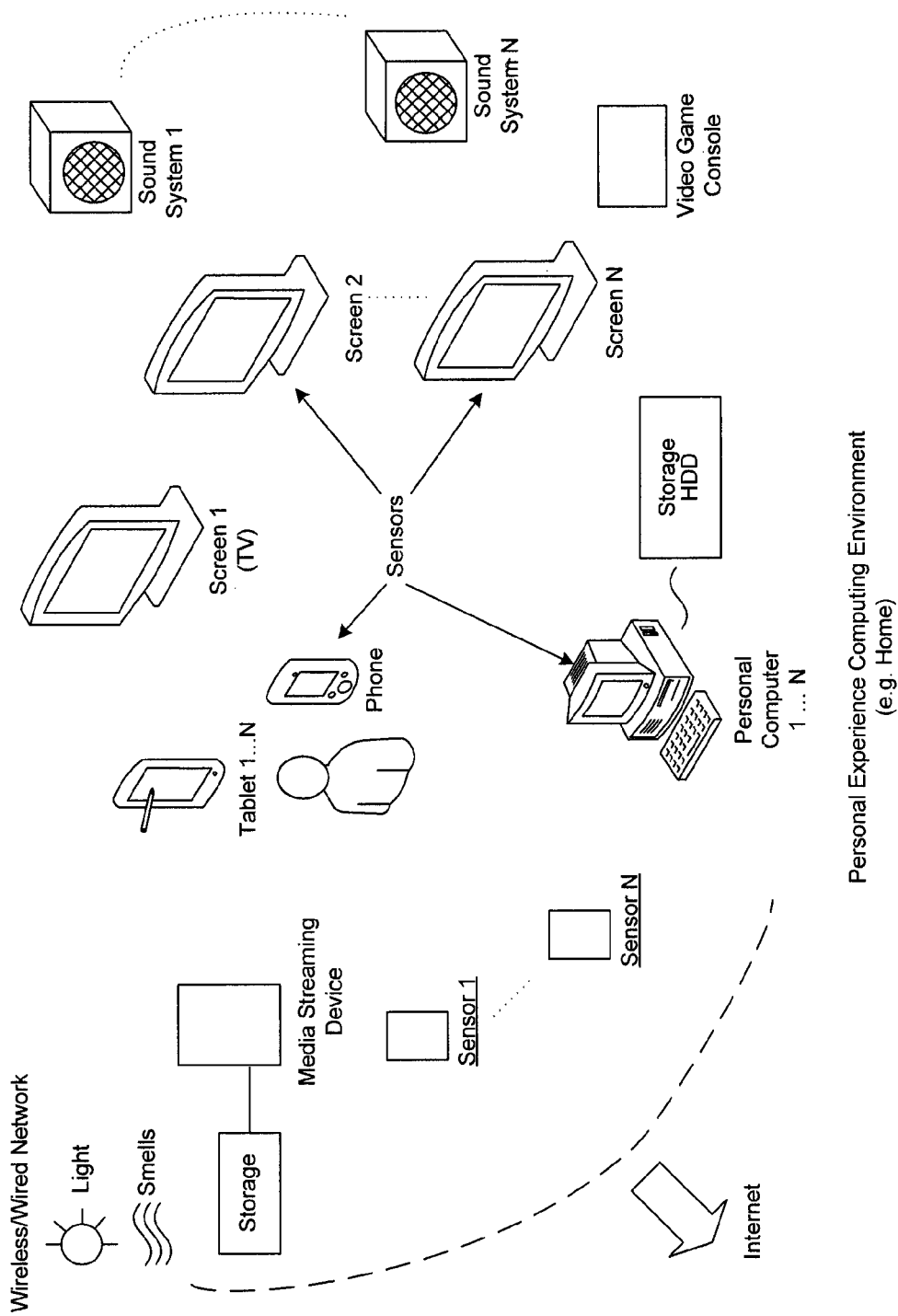
FIG. 2 is a block diagram of a personal experience computing environment.
Figure 3:
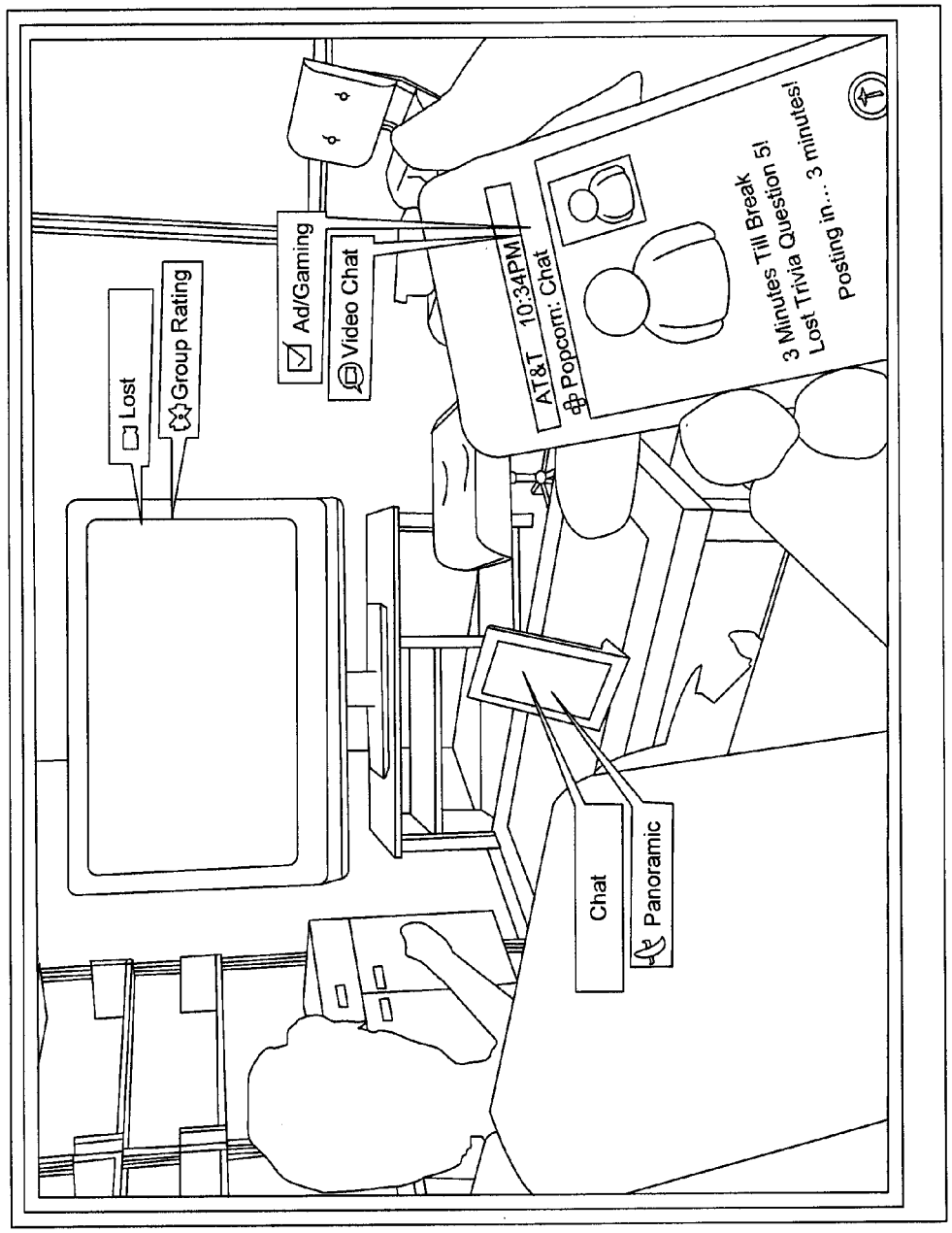
FIGS. 3-4 illustrates an exemplary personal experience computing environment.
Figure 4:
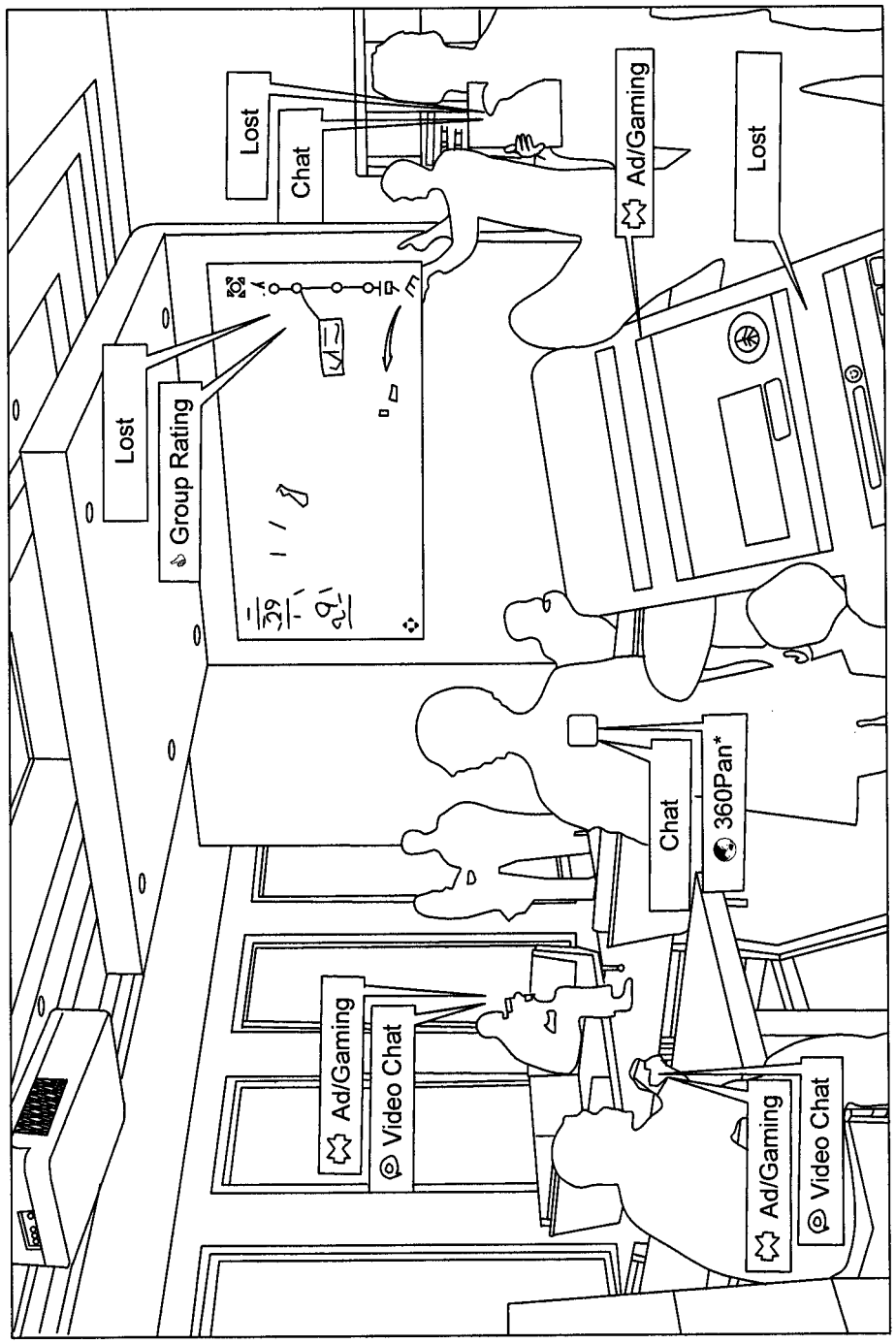
Figure 5:
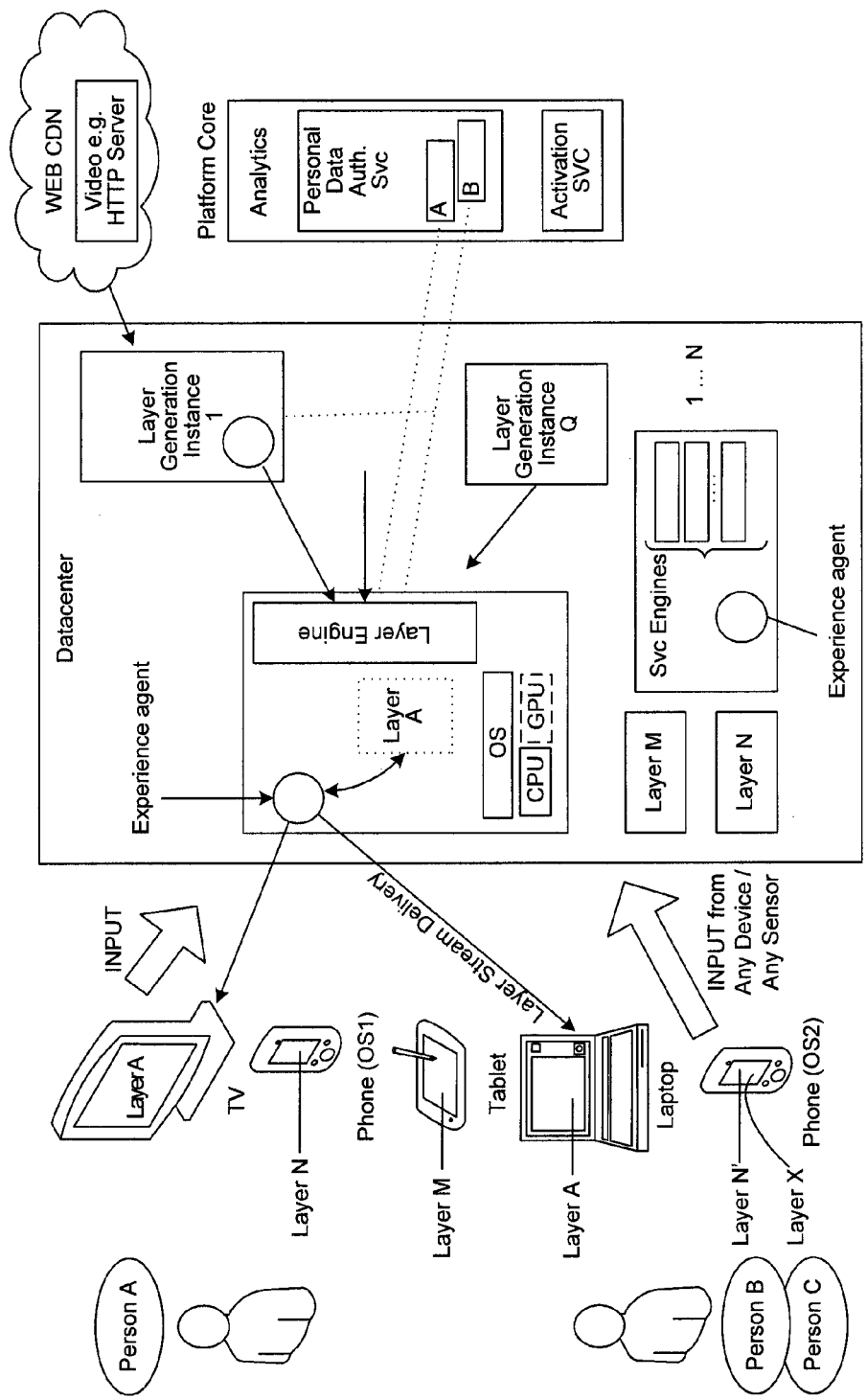
FIG. 5 illustrates an architecture of a capacity datacenter and a scenario of layer generation, splitting, remixing.

FIG. 2 illustrates a block diagram of a personal experience computing environment. An exemplary embodiment of such a personal experience computing environment is further discussed in detail, for example, with reference to FIGS. 3, 4, and 9.

Figure 6:
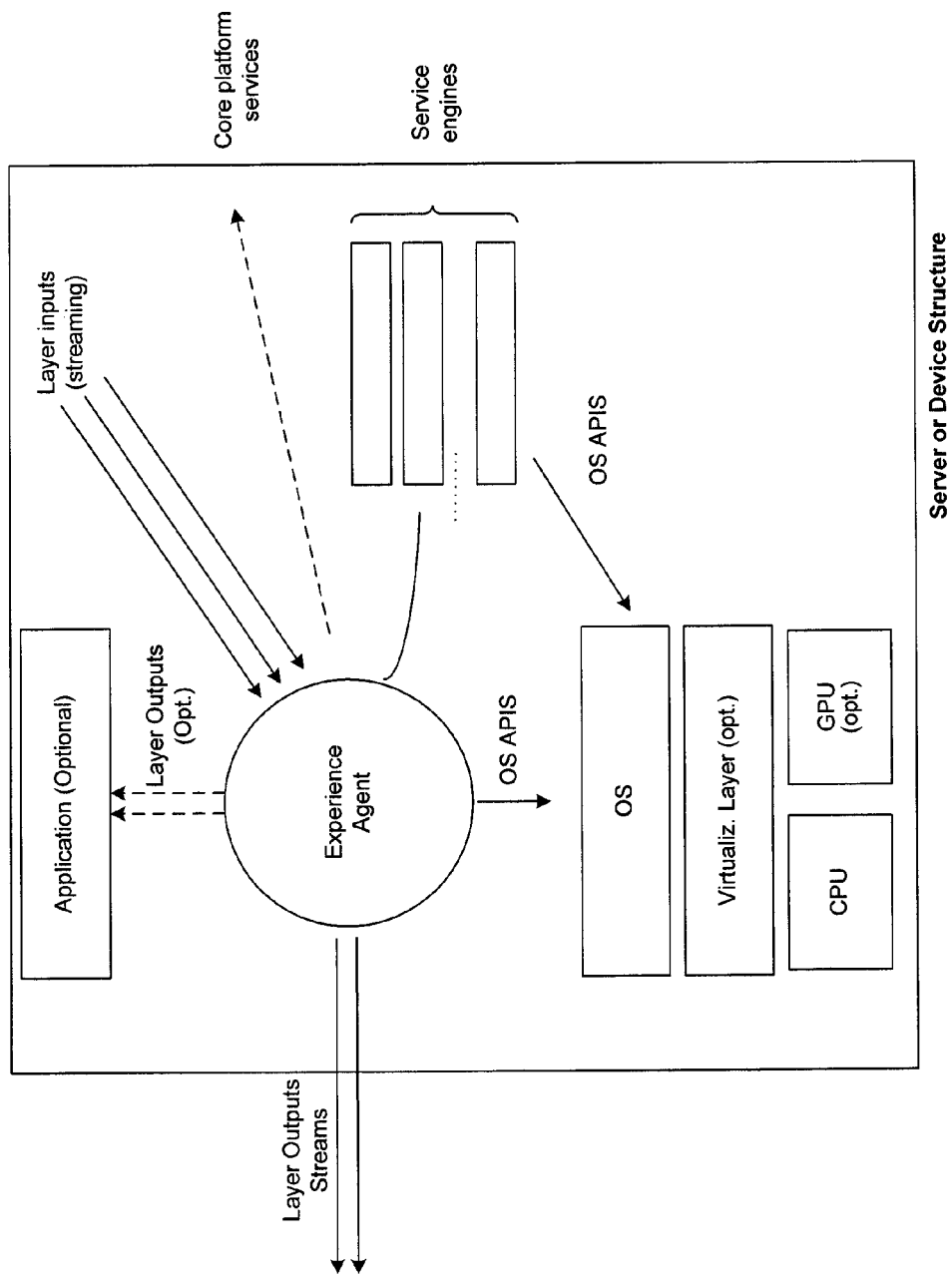
FIG. 6 illustrates an exemplary structure of an experience agent.

As illustrated in FIG. 6, the data center includes features and mechanisms for layer generation. The data center, in embodiments, includes an experience agent for communicating and transmitting layers to the various devices. As will be appreciated, data center can be hosted in a distributed manner in the "cloud," and typically the elements of the data center are coupled via a low latency network. FIG. 6 further illustrates the data center receiving inputs from various devices or sensors (e.g., by means of a gesture for a virtual experience to be delivered), and the data center causing various corresponding layers to be generated and transmitted in response. The data center includes a layer or experience composition engine. In one embodiment, the composition engine is defined and controlled by the experience provider to compose and direct the experience for one or more participants utilizing devices. Direction and composition is accomplished, in part, by merging various content layers and other elements into dimensions generated from a variety of sources such as the service provider, the devices, content servers, and/or the service platform. As with other components of the platform, in embodiments, the data center includes an experience agent for communicating with, for example, the various devices, the platform core, etc. The data center may also comprise service engines or connections to one or more virtual engines for the purpose of generating and transmitting the various layer components.

The experience platform, platform core, data center, etc. can be implemented on a single computer system, or more likely distributed across a variety of computer systems, and at various locations.

The experience platform, the data center, the various devices, etc. include at least one experience agent and an operating system, as illustrated, for example, in FIG. 6. The experience agent optionally communicates with the application for providing layer outputs. In instances, the experience agent is responsible for receiving layer inputs transmitted by other devices or agents, or transmitting layer outputs to other devices or agents. In some instances, the experience agent may also communicate with service engines to manage layer generation and streamlined optimization of layer output.

Figure 7:
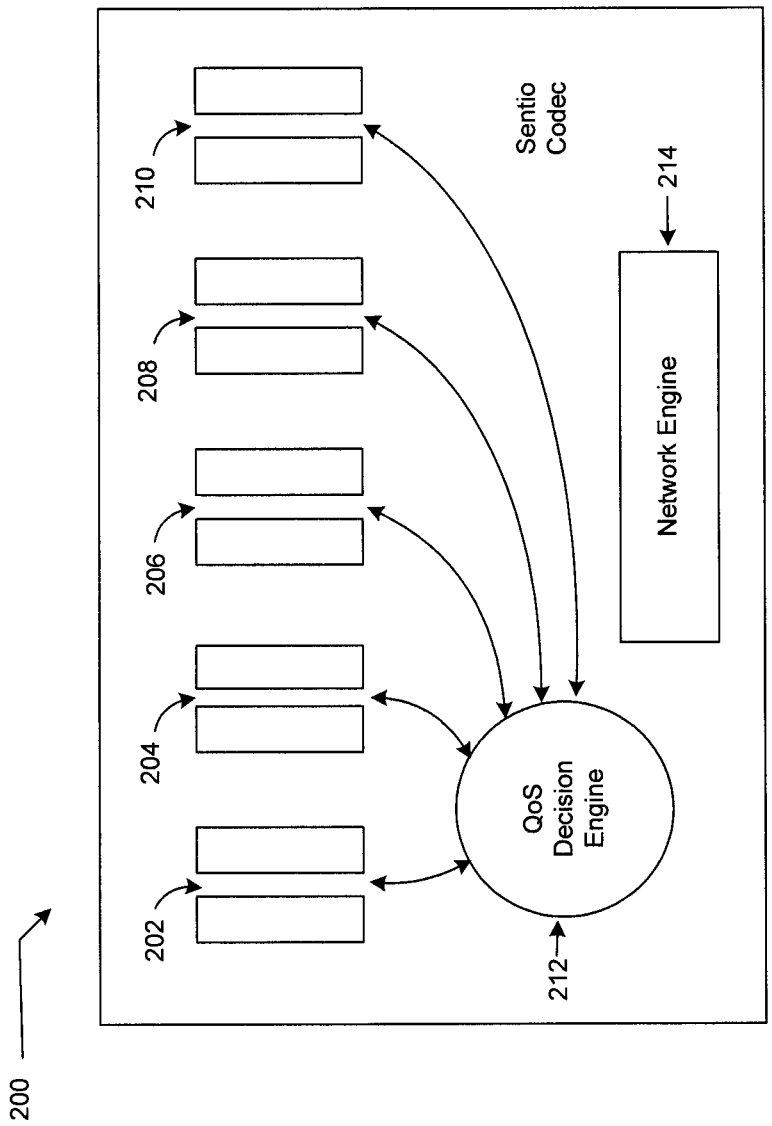
FIG. 7 illustrates an exemplary Sentio codec operational architecture.

FIG. 7 illustrates a block diagram of a sentio codec 200. The sentio codec 200 includes a plurality of codecs such as video codecs 202, audio codecs 204, graphic language codecs 206, sensor data codecs 208, and emotion codecs 210. The sentio codec 200 further includes a quality of service (QoS) decision engine 212 and a network engine 214. The codecs, the QoS decision engine 212, and the network engine 214 work together to encode one or more data streams and transmit the encoded data according to a low-latency transfer protocol supporting the various encoded data types. One example of this low-latency protocol is described in more detail in Vonog et al.'s U.S. patent application Ser. No. 12/569,876, filed Sep. 29, 2009, and incorporated herein by reference for all purposes including the low-latency protocol and related features such as the network engine and network stack arrangement.

The sentio codec 200 can be designed to take all aspects of the experience platform into consideration when executing the transfer protocol. The parameters and aspects include available network bandwidth, transmission device characteristics and receiving device characteristics. Additionally, the sentio codec 200 can be implemented to be responsive to commands from an experience composition engine or other outside entity to determine how to prioritize data for transmission. In many applications, because of human response, audio is the most important component of an experience data stream. However, a specific application may desire to emphasize video or gesture commands.

The sentio codec provides the capability of encoding data streams corresponding with many different senses or dimensions of an experience. For example, a device may include a video camera capturing video images and audio from a participant. The user image and audio data may be encoded and transmitted directly or, perhaps after some intermediate processing, via the experience composition engine, to the service platform where one or a combination of the service engines can analyze the data stream to make a determination about an emotion of the participant. This emotion can then be encoded by the sentio codec and transmitted to the experience composition engine, which in turn can incorporate this into a dimension of the experience. Similarly a participant gesture can be captured as a data stream, e.g. by a motion sensor or a camera on device, and then transmitted to the service platform, where the gesture can be interpreted, and transmitted to the experience composition engine or directly back to one or more devices 12 for incorporation into a dimension of the experience.

Figure 8:
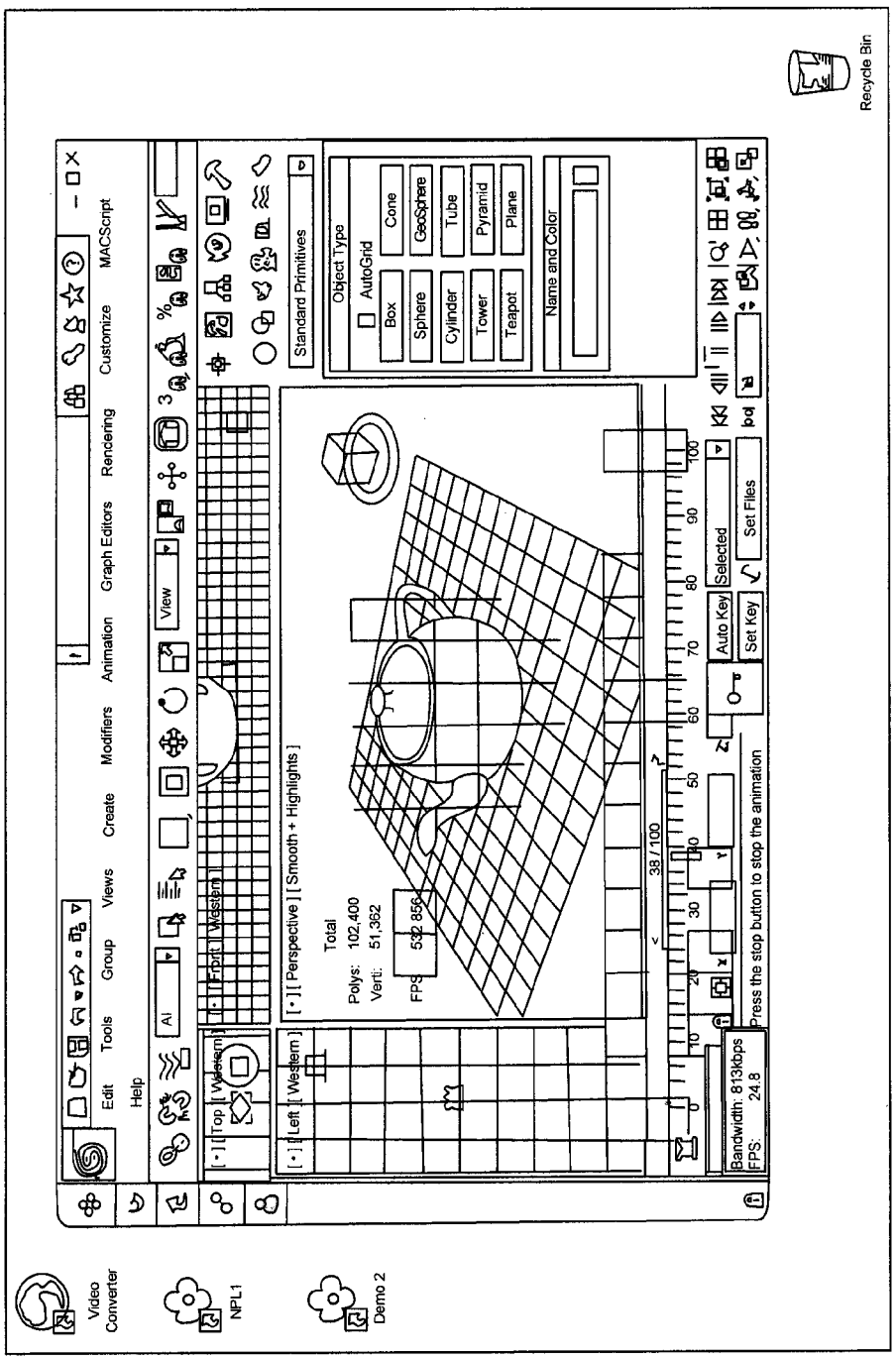
FIG. 8 illustrates an exemplary experience involving the merger of various layers.

FIG. 8 provides an example experience showing 4 layers. These layers are distributed across various different devices. For example, a first layer is Autodesk 3ds Max instantiated on a suitable layer source, such as on an experience server or a content server. A second layer is an interactive frame around the 3ds Max layer, and in this example is generated on a client device by an experience agent. A third layer is the black box in the bottom-left corner with the text "FPS" and "bandwidth", and is generated on the client device but pulls data by accessing a service engine available on the service platform. A fourth layer is a red-green-yellow grid which demonstrates an aspect of the low-latency transfer protocol (e.g., different regions being selectively encoded) and is generated and computed on the service platform, and then merged with the 3ds Max layer on the experience server.

The description above illustrated how a specific application, an "experience," can operate and how such an application can be generated as a composite of layers. FIGS. 9-14, explained below in detail, now illustrate methods and systems for transferring users' gestures to actions or experiences in conjunction with, for example, the platform discussed above.

According to one embodiment, the present system, a "gesture paradigm," provides for gestures performed by users holding devices to be recognized and processed in a cloud computing environment such that the gestures produce a predefined desired result. According to one embodiment, a server communicates with a first device in a cloud computing environment, wherein the first device can detect surrounding devices, and an application program is executable by the server, wherein the application program is controlled by the first device and the output of the application program is directed by the server to one of the devices detected by the first device. According to one embodiment, devices have a variety of input and output capabilities, depending on hardware and enabled features of the devices. Examples of detection for input include but are not limited to accelerometers, gyrometers, motion detection in general, video recognition, voice recognition, multi-touch, the ability to sense breath or air as an input, barometer, wireless communication and a thermometer. Output capabilities include yet are not limited to audio, video, vibration, and wireless communication. The combinations of the device input capabilities enable device users to act out gestures as input and affect some predefined output or result that is associated with the gesture input. Gestures are sensed as input from the device to the cloud, and processed in the cloud or optionally on the device, and a desired output is produced as a result.

Gestures, as indicated herein, are performed with any multitude of enabled devices, including yet not limited to mobile internet devices, laptops, stadium and concert environments (including displays and speakers). Gestures are performed to transmit or manipulate data and virtual experiences, and gestures can be performed in a social interaction context. Examples of gestures performed in a social interaction context include but are not limited to poking another user, petting, kissing, applause, sending a user away, inviting a user to join, indicating attraction, indicating pity. Intensity of a gesture can be increased or decreased through detection of various input, including yet not limited to audio volume, audio tone, facial expression, type of action, acceleration of action. Forming a group of users and/or devices can be performed through several methods, including but not limited to a traditional social networking means (invite and accept via email), GPS, Bluetooth, Wifi, and a bump or a gesture.

Figure 9:
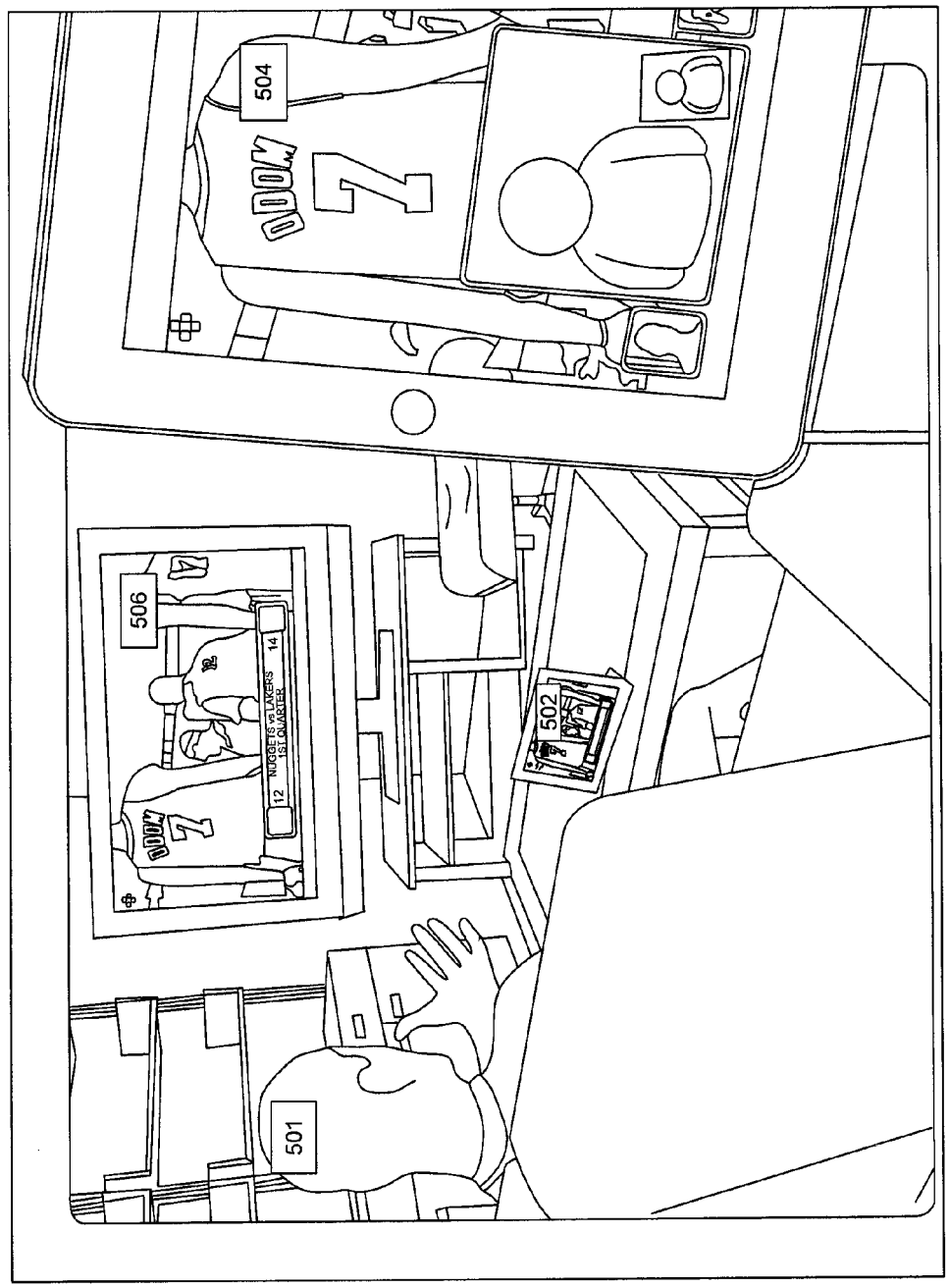
FIG. 9 provides description of an exemplary embodiment of a system environment that may be used to practice the various techniques discussed herein.

FIG. 9 illustrates such an exemplary scenario of a video ensemble where several users watch a TV game virtually "together." This ensemble is representative of several users contemporarily connected within an interactive social networking platform for communicating messages and expressions in real time. A first user 501 watches the show using a tablet device 502. A second user (not shown) watches the show using another handheld computing device 504. Both users are connected to each other over a social platform (enabled, for example, using the experience platform discussed in reference to FIG. 1) and can see videos of each other and also communicate with each other (video or audio from the social platform may be superimposed over the TV show as illustrated in the figure). Further, at least some users watch also watch the same game on a large screen display devoice 506 that is located in the same physical room. The following section depicts one illustrative scenario of how user A 502 throws a rotten tomato over a that is playing over a social media (in a large display screen in a room that has several users with personal mobile devices connected to the virtual experience platform). As part of a virtual experience, user A may, in the illustrative example, portray the physical action of throwing a tomato (after choosing a tomato that is present as a virtual object) by using physical gestures on his screen (or by emulating physical gestures by emulating a throwing action of his tablet device). This physical action causes a tomato to move from the user's mobile device in an interconnected live-action format, where the virtual tomato first starts from the user's device, pans across the screen of the user's tablet device in a direction of the physical gesture, and after leaving the boundary of the screen of the user's mobile device, is then shown as hurling across through the central larger screen 506 (with appropriate delays to enhance reality of the virtual experience), and finally be splotched on the screen with appropriate virtual displays. In this example, the direction and trajectory of the transferred virtual object is dependent on the physical gesture (in this example). In addition to the visual experience, accompanying sound effects further add to the overall virtual experience. For example, when the "tomato throw" starts from the user's tablet device 502, a swoosh sound first emanates from the user's mobile device and then follows the visual cues (e.g., sound is transferred to the larger device 506 when visual display of tomato first appears on the larger device 506) to provide a more realistic "throw" experience.

In the above exemplary virtual experience, the physical gesture was in the form of a "throw." In embodiments, the user 501's handheld device automatically detects other display devices (e.g., TV 502, tablet 504) to which the object could be thrown at. When the virtual object is thrown, user may target throw to one or more particular devices or may just throw to every device connected via the common social network platform. In embodiments, when the user initiates a throw action (e.g., by indicating through an experience agent on his handheld device that he will initiate an action or by automatically making a physical gesture that the experience agent understands to be a cue to perform an action), the handheld device communicates with, for example, the experience agent in a server device (e.g., the experience server). The server receives a "gesture signal" indicative of the user's action or gesture and then interprets an action to be made. For example, if the user's action was a throw after the use selects a virtual tomato, the server interprets the gesture signal to be a throw of the tomato on the screen (e.g., the screen detected by the user's device as being proximate to the user's device). The proximate device is also connected to the server via, for example, an experience agent, and is therefore able to receive commands from the server indicating an action to be performed. The action could be a virtual experience of the tomato swaying through the screen of the proximate device and then splotching on the screen of the proximate device. In embodiments, the experience server may determine an animation and virtual experience to correspond to the user's gesture. Such virtual experiences are explained in detail in U.S. application Ser. No. 13/210,364, filed concurrently by the inventors of this application, entitled "METHODS AND SYSTEMS FOR VIRTUAL EXPERIENCES," which is incorporated in it is entirety herein. The server may interpret an intensity (e.g., the velocity) of the throw, the trajectory of the throw, etc. based on the received gesture signal and can then cause the corresponding animation to be rendered taking into account such parameters.

While the above example illustrates a very elementary and exemplary illustration of using gestures in the context of virtual experiences, such principles can be ported to numerous applications that involve, for example, emotions surrounding everyday activities, such as, for example, watching sports activities together (e.g., throw a tomato on the screen), congratulating other users on personal events or accomplishments on a shared online game (e.g., throw flowers on the screen), have an interactive experience with the screen (e.g., play a video game where articles are thrown or flung across the screen), normal execution tasks (e.g., specific movement of the devices, such as, an X sign or a Z sign to perform corresponding operations on a screen such as closing a window, starting an application, zooming in a screen, etc.), transferring emotions (e.g., applauding with the handheld device causing applause to be displayed or played via audio on the proximately detected device, blowing over the device causing flowers to be "blown" in a direction toward the screen of the proximate device, capturing a user's facial expression using a camera to capture a sad face or a smiley face and cause corresponding emotions to be displayed or played on the proximate screen, etc.), etc. It is contemplated that the above illustrative example may be extended to numerous other circumstances where one or more virtual goods may be portrayed along with emotions, physicality, dimensionality, etc. that provide users an overall virtual experience using physical gestures. It is also understood that the virtual experience or any other experience effected on the screen as a result of the gesture may include any combination of media component (e.g., audio, video, etc.). Also, in embodiments, users may incorporate multiple physical gestures to cause a given experience. As an example, a user may cause the handheld device to capture an image of his face and then throw the image to a proximate device. In such a case, the server may perform known image recognition routines to identify an emotion of the user (e.g., happy face, sad face, etc.), and then cause, for example, a corresponding "emoticon" to be displayed or thrown on the display of the proximate device.

It is also understood that such transfer of emotions and other such experiences may pan over multiple computing devices, sensors, displays, displays within displays or split displays, etc. The overall rendering and execution of the gestures and corresponding virtual experiences may be specific to each local machine or may all be controlled overall over a cloud environment (e.g., Amazon cloud services), where a server computing unit on the cloud maintains connectivity (e.g., using APIs) with the devices associated with the virtual experience platform. In some embodiments, gesture encoding and decoding may happen at a device level, with the server communicating the gesture signal to the corresponding devices. In other embodiments, gesture signal encoding and decoding may happen at the server level, with the server providing detailed instructions on the type of experience to be offered based on an interpretation of the decoded gesture signal.

The following description provides exemplary non-limiting examples of some of the potential gestures that may be offered to initiate or cause experiences within the paradigm discussed herein:

Throw: User A holding a first mobile device gestures with the device as if User A is throwing something. The destination can be another user holding another device, or any other enabled device within a set proximity of the first mobile device held by User A. The first mobile device and the destination device are aware of each other. The affect of the throw gesture can be defined as anything, by way of example a throw can implement a data transfer or application control transfer (e.g. user A throws a file to the destination device). Exemplary device capabilities for sensing a throw gesture include a gyroscope Point: User A holding a first mobile device simply points to a destination device. The first mobile device and the destination device are aware of each other. The affect of the point gesture can be defined as anything, by way of example a point can implement a data transfer or application control transfer (e.g. user A points and transfers a file to the destination device).

Applause: User A holding a first mobile device in one hand can tap the device using the other hand to indicate applause. The applause is registered on the first mobile device display, or on another enabled device in the vicinity (or that is aware of the first mobile device). User A holding the first mobile device can also shake the device to indicate applause. The first mobile device can also detect the sound of applause through audio detection and the level of applause is displayed on the first mobile device display or another enabled device in the vicinity (or that is aware of the first mobile device). In some instances, the level of applause registered and virtually delivered on a device may be dependent on an intensity of applause in a particular setting. For example, if there are five users in a room watching a football game on a TV where virtual experiences (e.g., applause registered from the users) are delivered, the intensity and appearance of the applause may be proportional to a total number of users performing an applause gesture at a given moment. A feeble applause virtual experience may be delivered with one person performs an applause gesture with his personal device, while a rapturous applause of a virtual experience may be delivered upon detection of applause gestures by all five users at the same time.

Volume control: User A holding a first mobile device can change the volume of audio associated with a destination device by either moving the first mobile device up (turn volume up) or down (turn volume down). Similarly, volume can be controlled by moving the device from side to side.

X or \: User A holding a first mobile device can affect a result by drawing an X in the air using the first mobile device, or by making a slash or a swipe motion. The result of an X or a \ can be defined as anything, by way of example the result of an X or a \ includes yet is not limited to making a person in video chat or chat disappear, canceling an operation, closing a window, sending a device to sleep.

Building a group: User A holding a first mobile device can invite another device (held by another user or not) to join a particular group. The group can be any kind of group. Example gestures for building a group include holding the first mobile device and gesturing as if to say "come here" to have another device join a group containing the first mobile device. Another example gesture for group management includes drawing an X using the first mobile device to signal telling the other device to "go away."

Data transfer: User A holding a first mobile device can transfer data to another device through pointing as mentioned above, throwing as mentioned above, or blowing into the first mobile device where appropriate.

Transmit emotions: User A holding a first mobile device can transfer emotions that are associated with a gesture alone, a gesture combined with voice input, a gesture combined with a facial input, or the combination of a gesture, voice input, and facial input. Combinations to transmit emotions can be defined as anything, examples include shaking the device to indicate joy, or using the device to indicate pity through a "petting" motion.

Draw geometric shapes: Similar to the description of drawing an X or a \ above, any geometric shape can be defined as a gesture to affect a particular outcome. Shapes include yet are not limited to circles, triangles, squares, and rectangles.

Spin: User A holding a first mobile device can place the first mobile device onto a surface and spin it. The spinning can be a defined gesture input to affect any outcome, for example a game called spin the bottle that involves displaying where the bottle lands and is pointing.

Figure 10:
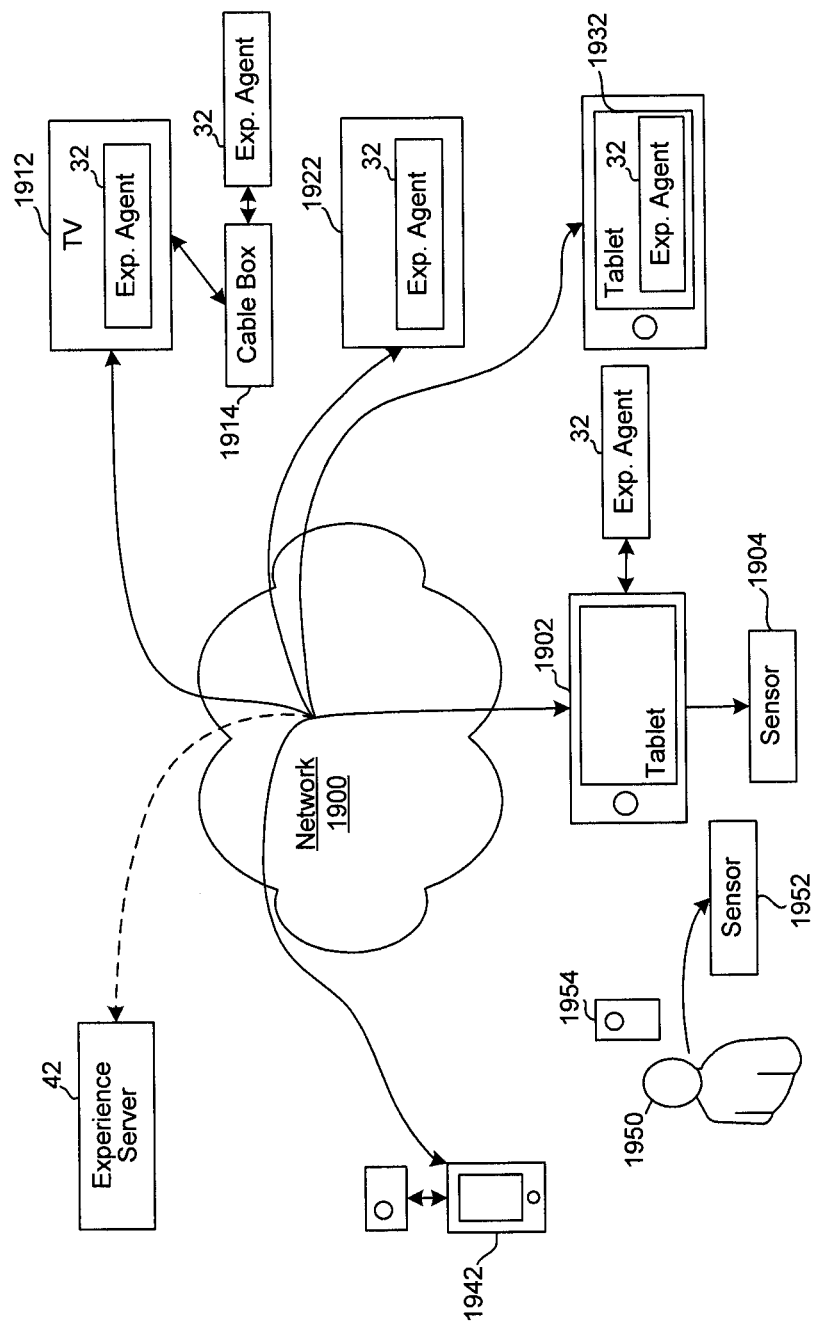
FIG. 10 illustrates such a scenario of a video ensemble where several users watch a TV game virtually "together;"

Facial input: As mentioned above in the section describing transmitting emotions, facial input can be defined to affect an output or occurrence. For example, a frown on a user's face can be detected by a device and make a particular other user disappear from a chat group or window The above discussion provided a detailed description of the fundamentals involved in using gestures for providing various experiences. The following description, with reference to FIGS. 10-14 now provide description of exemplary embodiments of system environments that may be used to practice the various techniques discussed herein. FIG. 10 discusses an example of a system environment that practices the paradigm that allows for virtual gestures. Here, for example, several users are connected to a common social networking event (e.g., watching a football game together virtually connected on a communication platform). User 1950 utilizes, for example, a tablet device 1902 to participate in the virtual experience. User 1950 may use sensors 1904 (e.g., mouse pointers, physical movement sensors, camera, barometers, etc.) that are built within the tablet 1902 or may simply use a separate sensor device 1952 (e.g., a smart phone that can detect movement 1954, a Wii® controller, etc.) for gesture indications. In embodiments, the tablet 190 and/or the phone 1954 are all fitted (or installed) with experience agent instantiations. These experience agents and their operational features are discussed above in detail with reference to FIGS. 1-2. An experience serve, may for example, be connected with the various interconnected devices over a network 1900. As discussed above, the experience server may be a single server offering all computational resources for providing virtual goods, creating virtual experiences, and managing provision of experience among the various interconnected user devices. In other examples, the experience server may be instantiated as one or more virtual machines in a cloud computing environment connected with network 1900. As explained above, the experience server may communicate with the user devices via experience agents. In at least some embodiments, the experience server may use Sentio code (for communication and computational purposes (for gesture signal decoding and encoding, for example).

When a user initiates a gesture to cause, for example, a virtual experience, the resulting experience is propagated as desired to one or more of other connected devices that are connected with the user for a particular virtual experience paradigm setting (e.g., a setting where a group of friends are connected over a communication platform to watch a video stream of a football game, as illustrated, e.g., in FIG. 10). When the virtual experience is initiated by user 1950, the experience may be synchronously or asynchronously conveyed to the other devices. In one example, an experience (throw of a tomato) is conveyed to one or more of several devices. The devices in the illustrated scenario include, for example, a TV 1912. The TV 1912 may be a smart TV capable of having an experience agent of its own, or may communicate with the virtual experience paradigm using, for example, experience agent 32 installed in a set top box 1914 connected to the TV 1912. Similarly, another connected device could be a laptop 1922, or a tablet 1932, or a mobile device 1942 with an experience agent 32 installation.

In the above exemplary system, the target device for a gesture may be selected, for example, automatically or based on user action. In an exemplary scenario, the client device 1954 (and/or 1902) automatically detects one or more of the proximate devices. In one example, the client device 1902 provides a list of available devices and the user 1950 may then choose one or more of such proximate devices to target a gesture. In embodiments, each of these devices have an experience agent 32 that enables them to communicate with a server device (e.g., an experience server 32), enabling discovery of proximate devices through algorithms executed in the experience server. In one example, user 1950 may wish to throw a virtual object at client device 1912, which is a TV with an embedded (or associated) experience agent. In prior art systems, at the very least, client device 1912 would need to be fitted with specific electronics to be able to capture any physical gesture that is directed at the device from the user 1950 that is within a proximate distance. Here, however, no special electronics are needed. The client device 1912 is merely installed with an experience agent, allowing the client device to communicate with a server device. In embodiments, the server is remote (i.e., not within direct physical proximity of) any of the client devices. Each client device utilizes, for example, the experience agent to communicate with this remote server device.

Accordingly, in operation, the user 1950 uses device 1902 to perform a physical gesture. This gesture is captured by sensors in the user device 1902, which is then transmitted to the server device. In embodiments, the server device then communicates this "gesture signal" over to the intended proximate device(s). Therefore, the target devices do not need to be fitted with any special electronics to be able to receive and perform actions based on gestures performed by a proximate user. In embodiments, either user device 1902 or target client device 1912 (or both devices) participate in encoding and decoding the gesture signal to be able to interpret the nature of the gesture and identify relevant actions (e.g., virtual experience, animation, etc.) to perform with respect to the target client device 1912. In embodiments, such encoding and decoding may simply happen in the server device, and appropriate commands for relevant actions are then transmitted to the target client device.

Figure 11:
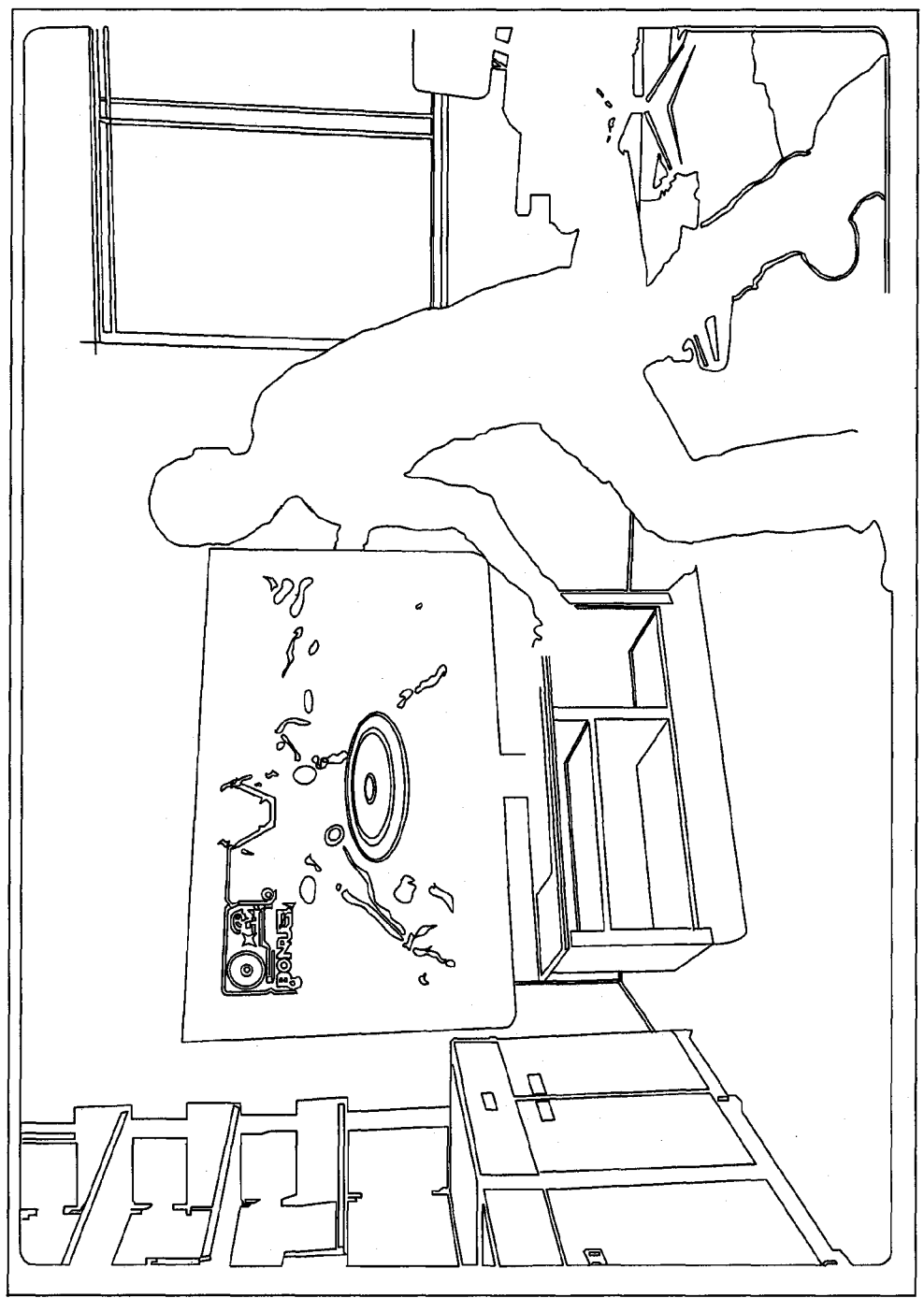
FIGS. 11-14 depict various illustrative examples of virtual experiences that may be offered in conjunction with gestures.

FIGS. 11-14 now depict various illustrative examples of virtual experiences that are brought about based on users' physical gestures. FIG. 11 depicts a scenario where a user is playing, for example a video game, which requires a disc to be thrown at a virtual character on the screen. It is noted that the TV here is not fit with any special electronics to be able to recognize or identify a physical gesture. Similarly, in embodiments, the user's client device is not special-purpose hardware, but simply, for example, a smart phone with sensors to capture the user's gestures. When the user's gesture of throwing a disk is captured, the information is transmitted to the server device connected over a communication network. In embodiments, the server device generates a corresponding animation, creating a virtual experience. This virtual experience may account for parameters associated with the user's throw, such as trajectory, velocity, spin, etc. Accordingly, a virtual experience is generated allowing the user to directly interact with another client device, where the only source of connection is through a backend connection to an experience agent setup.

Figure 12:
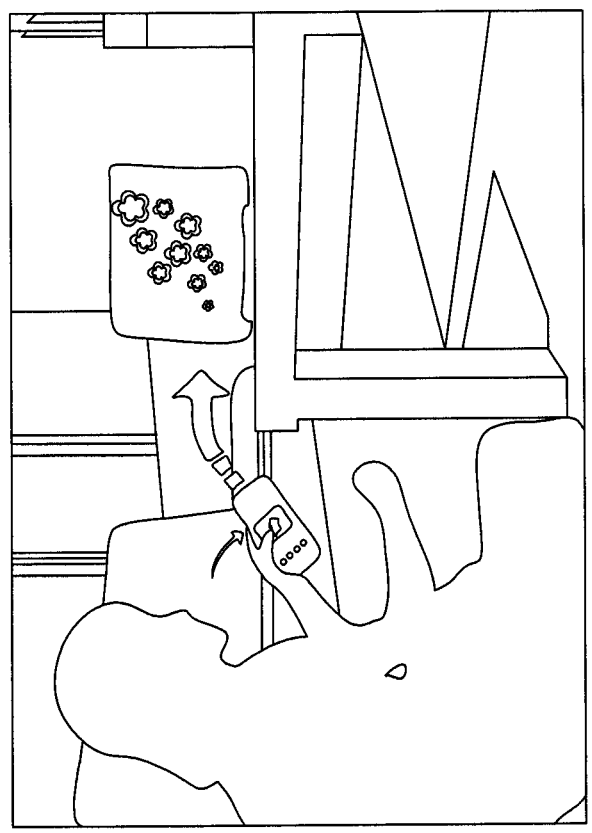
Figure 13:
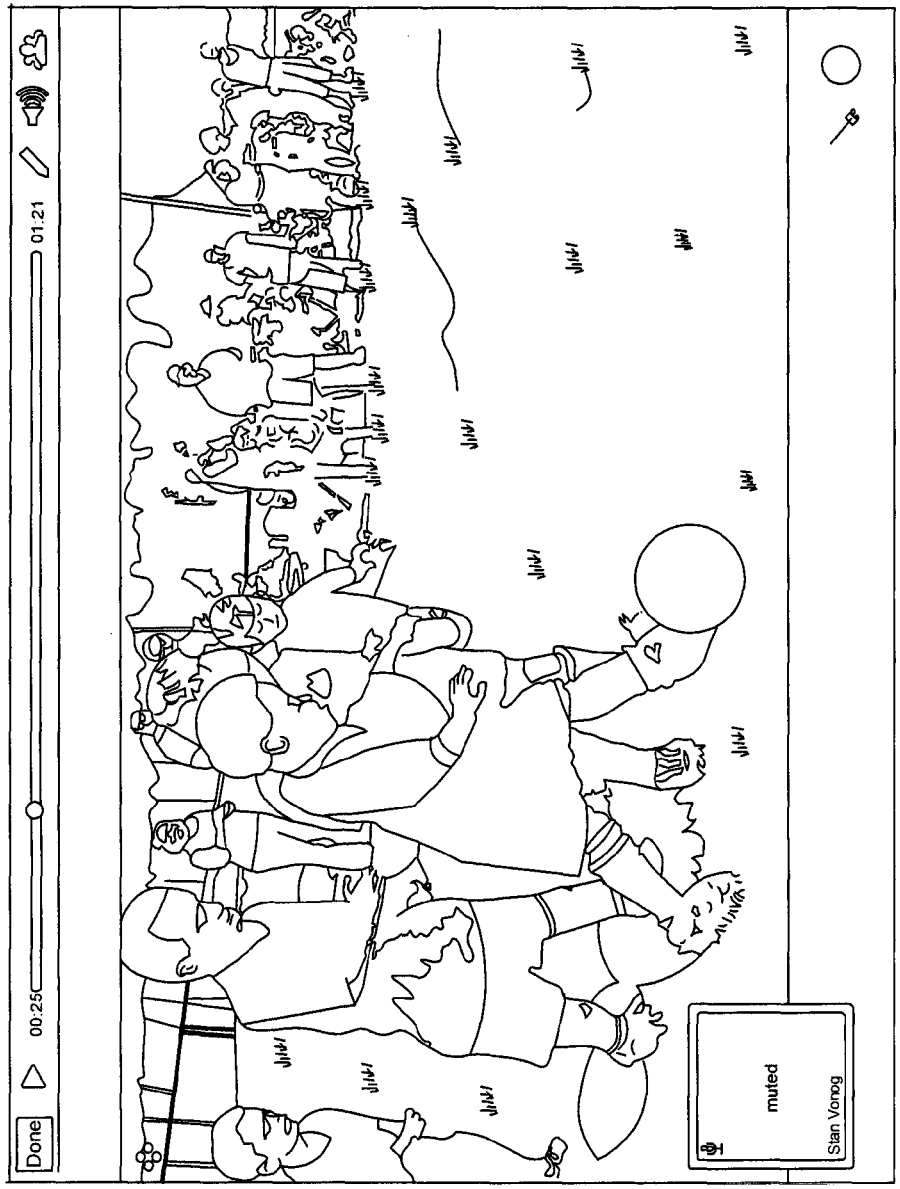
Figure 14:
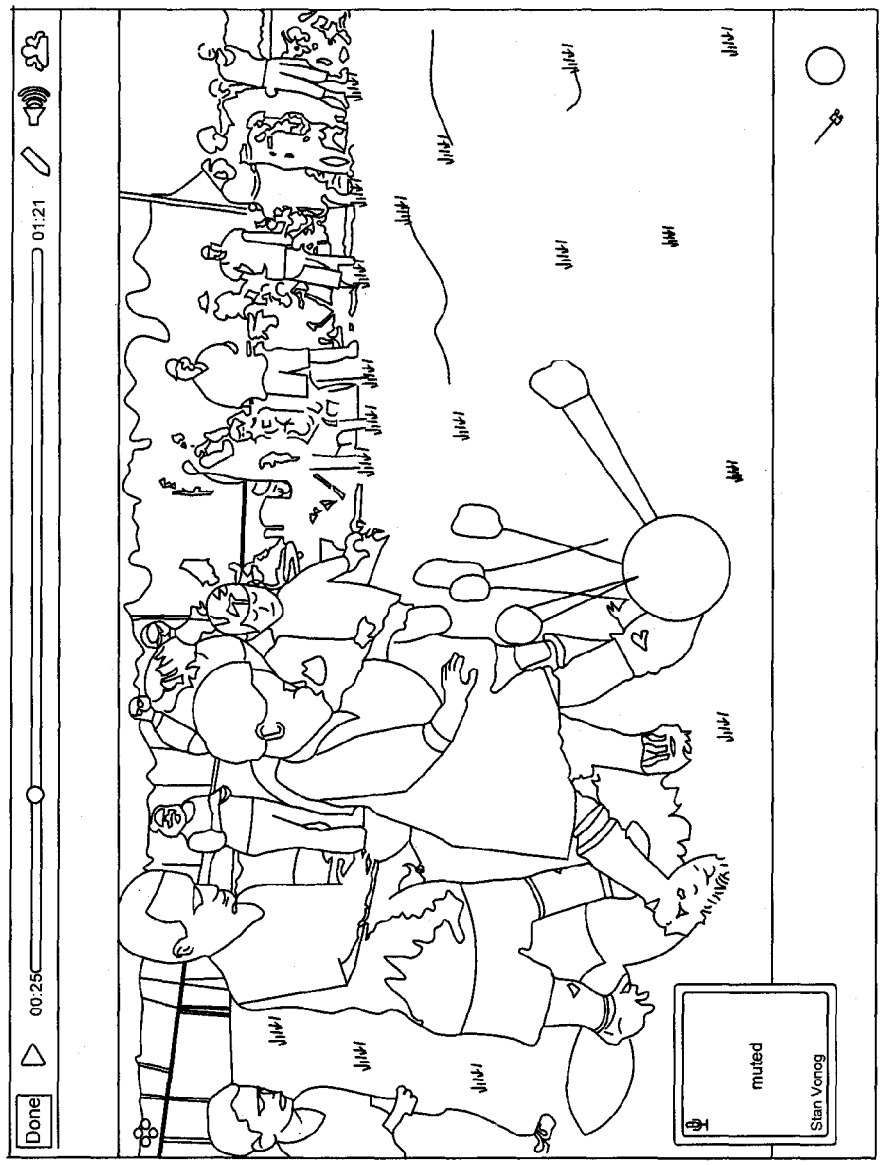

FIG. 12 is another similar example where the user throws flowers on a screen to express appreciation for the displayed content. FIGS. 13 and 14 represent a scenario where multiple users are watching a video while commonly connected to a communication network. As depicted in FIG. 14, a user may wish to throw flowers at the video, in which case the gesture is translated to a virtual experience as depicted in FIG. 14.

Figure 15:
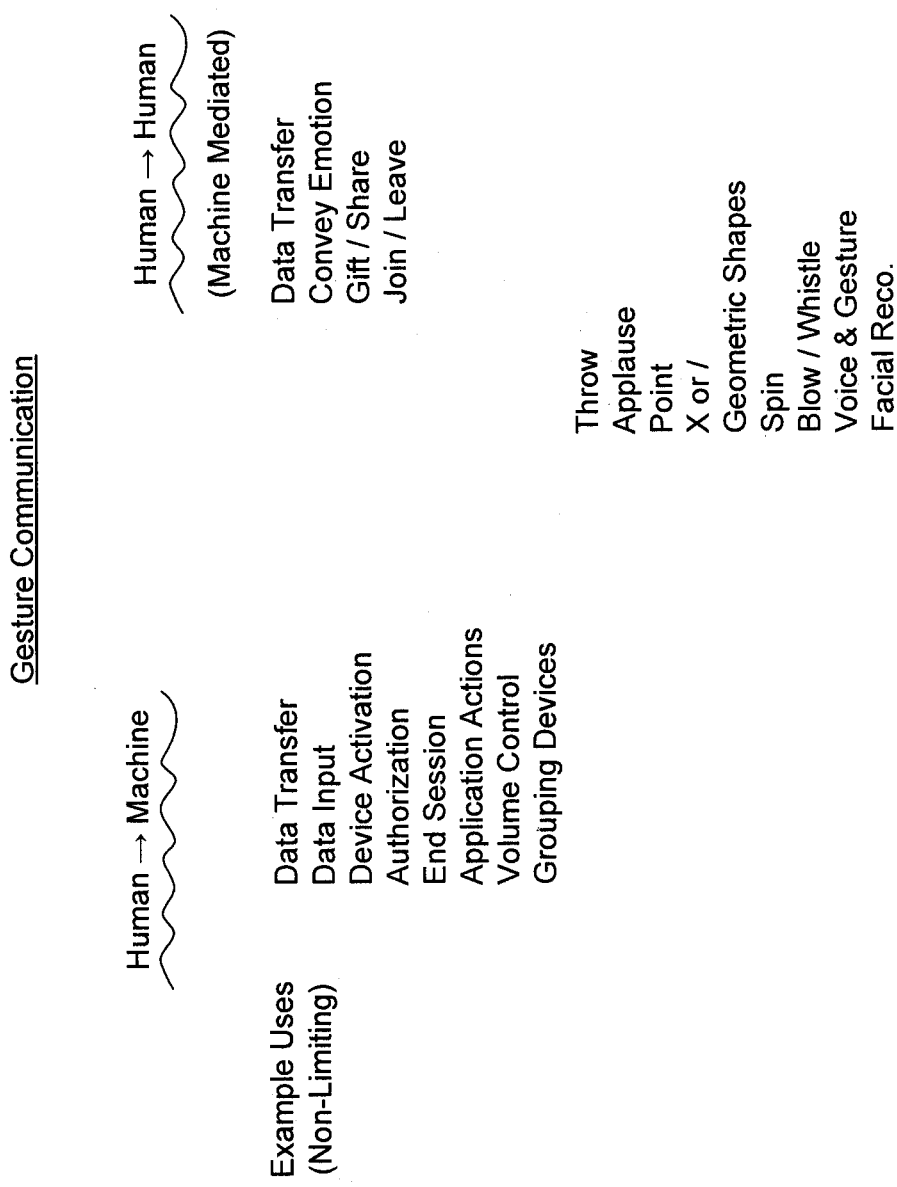
FIG. 15 illustrates examples of various types of gesture communications.

The following sections provide further description of gesture processing, including gesture communication fundamentals, examples, and exemplary system architectures with reference to FIGS. 15 through 25. As discussed above, the techniques herein are targeted to distributed, multi-sensor, device-independent gesture processing. A motivation for such techniques is for facilitating communication with gestures. It is important how people use gestures to talk, to express their emotions and to convey their thoughts. So gestures in a broad sense can be used for such communications because they are activated by humans can be used for human machine communication and to human to human communication as illustrated in FIG. 15. In human to human interactions, the gestures are machine mediated. So, gestures are amplified by a machine to create a much better effect, convey emotions much better to do the actions. The techniques described herein provide the convenience of doing everyday tasks in a multi-sensor, multi-device, multi-screen environment. FIG. 15 illustrates exemplary, non-limiting examples of some human to machine and some human to human gesture communications.

FIG. 16 illustrates several such examples. In one example of a human to machine communication, a motion tracking sensor recognizes your body, your skeletal structure and can translate movements of your hand or foot into a game action. So in this example, a sensor (e.g., a video camera) is connected via USB cable to an XBOX game console and a TV output is connected to the same XBOX console and the XBOX has a game DVD that interprets user's actions or gestures based on the device's processing capabilities and processes those gestures. Nintendo Wii components (e.g., Wii the remote controller) are examples of other integrated hardware systems. The sensor bar recognizes the infrared movement of the remote, which also has some accelerometers built in, so the sensor bar is connected to the game console, the TV is connected to the game console, the game DVD drives the game. And the user's gesture processing affects the game. In embodiments, some gesture processing may be realized in Wii. Example, FIG. 16C illustrates a slightly advanced example where two people wearing 3-D glasses are connected to a projector, and where tracking sensors manipulate 3-D images and tracking sensors to create images for them. Accordingly, in essence, this operates as a gestural virtual-reality based human machine that can manipulate data display and processing. Another example is in situations involving multi-touch devices and gestures (e.g., using multi-touch tablets as illustrated in the sub-sections of FIG. 16. These are examples of gestural communications that exist in prior art.

Further discussed with reference to prior art are human to human gestural communications assisted by technology. There is not really much that has been done to this date—human to human communications, as illustrated in FIG. 17, express gestures when communicating with other people. Examples include Skype virtual presence (where we are communicating with other people and we see their video image and their gesturing but that's just the transmission of an image). Other examples include MMS, multi-media text message when users send a picture or a video of experiences using, for example, YouTube, to convey emotions or thoughts—these really do not involve gestures, but greatly facilitates communication between people. Other examples include virtual environments like Second Life or other such video games, where one may perceive virtual character interaction as gestural because expressions are made—However, such communication is not gestural because they only involve capturing physical movements using special sensors.

Figure 18:
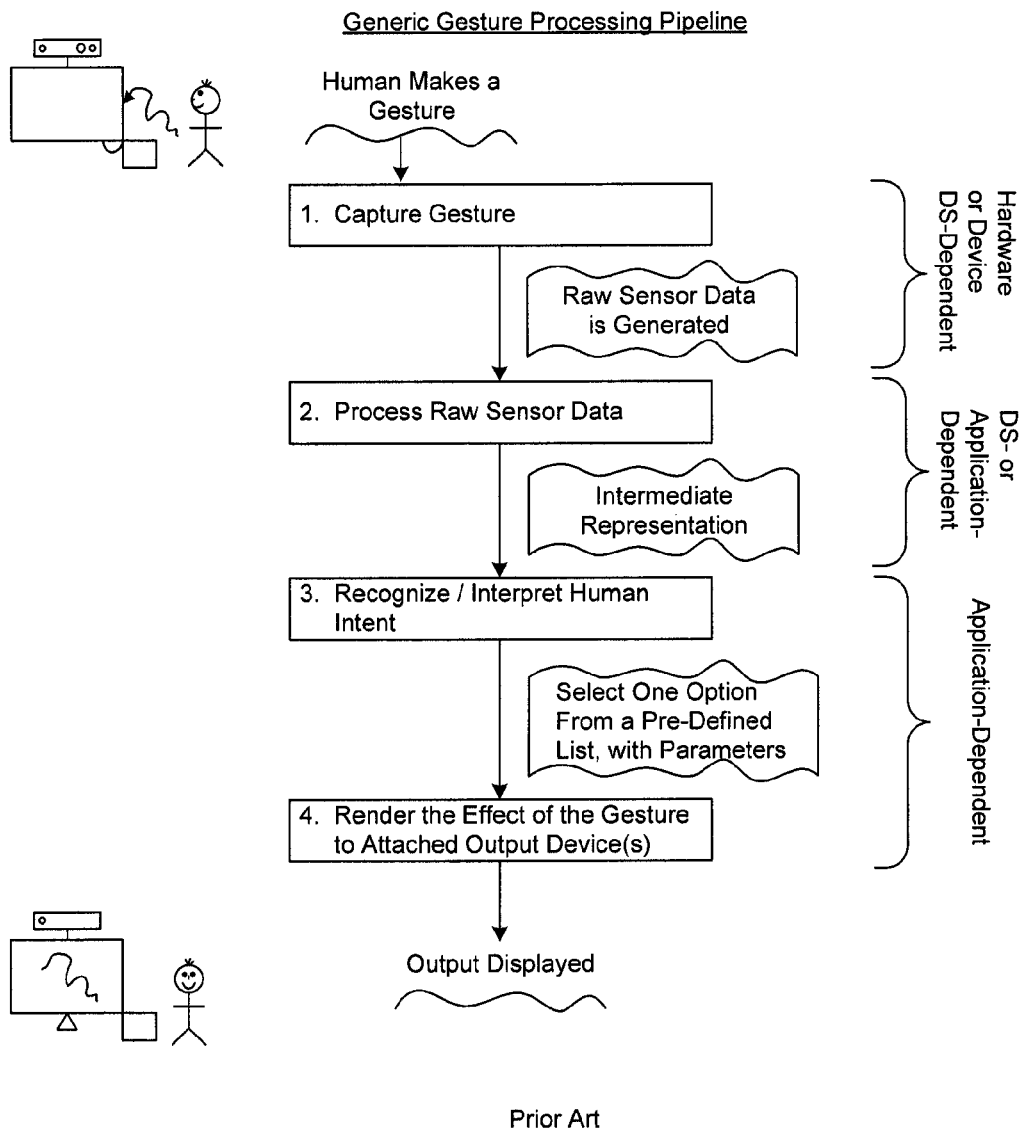
FIG. 18 illustrates prior art processing pipeline for generic gestural communications.

FIG. 18 now discusses a prior art exemplary processing of generic gestures. The illustrated sequence is implemented in technologies present in prior art. For example, Microsoft Connect uses multi-task tablets and screens for gestural processing as indicated in FIG. 18. In contrast to this type of prior art processing, he techniques introduced herein illustrate how we deviate from this prior art procedure by making a system for processing and recognizing gestures that is distributed and device independent (i.e., the gesture processing is not dependent on special sensors on electronics that eventually display actions that result from the gesture processing).

Figure 19:
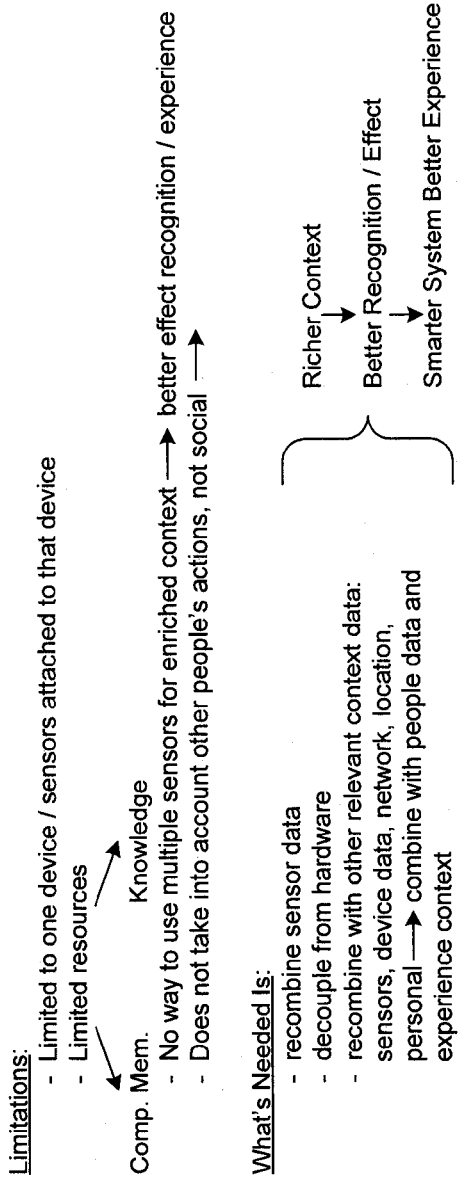
FIG. 19 is a chart describing at least some of the various limitations associated with prior art gestural communications and processing mechanisms.

FIG. 19 discloses some examples of defects or limitations with prior art "gestural" devices that are sought to be avoided by techniques discussed herein. The examples discussed above, Kinect, Wii, virtual reality environments, multi-touch dispersive tablets, etc., they are limited to one device. Their recognition and processing is limited to one device, and through sensors attached to that device. The device is limited by its resources (e.g., computing power, memory, etc). So in those systems, there is no way to use multiple sensors for enriched context. Even if both Wii and Microsoft Kinect are used and maybe some light sensors and home automation system are added to the mix, one cannot use that enriched context to produce a better effect of a user's gesture gesture, or an ultimately better experience for people doing this human-machine interaction. Additionally, these this setup would not take into account other people's actions. That is, it is not social, so other people cannot influence how gestures are displayed, who sent the gesture in a device-independent manner. So what is needed for richer context, better recognition effect, and better overall experience of interacting with those devices is to recombine all sensor data, using, for example, a multi-sensor, multi-device, multi-display environment. Here, the techniques involve decoupling sensor data streams from hardware, recombining with relevant context data, recombining with other relevant context data—sensors, device data, such as device capabilities, device location, network capabilities, real-time information about bandwidth jitter, packet loss delay; and combining it with people data—who is using it, who are the other people nearby and also experience context. Questions such as the following have ready answers: is it you are trying to send a virtual flower to your friend or are you cheering for a sports team, or you are watching a movie together with somebody. So this experience context is really important and can make you adjust the system in a generic way. To summarize, the goal is to develop a device-independent gesture processing and recognition system that is application-independent in a way that does not require the application to be able to process and recognize all this data or assume their own sensor devices. Of course, the actions are application-dependent but the translation is, in at least some embodiments, handled by the system that facilitates that interaction. In embodiments, processing could be done and distributed in multi-sensor environments and distributed in manners that enhance capabilities and ultimate user experiences.

Figure 20:
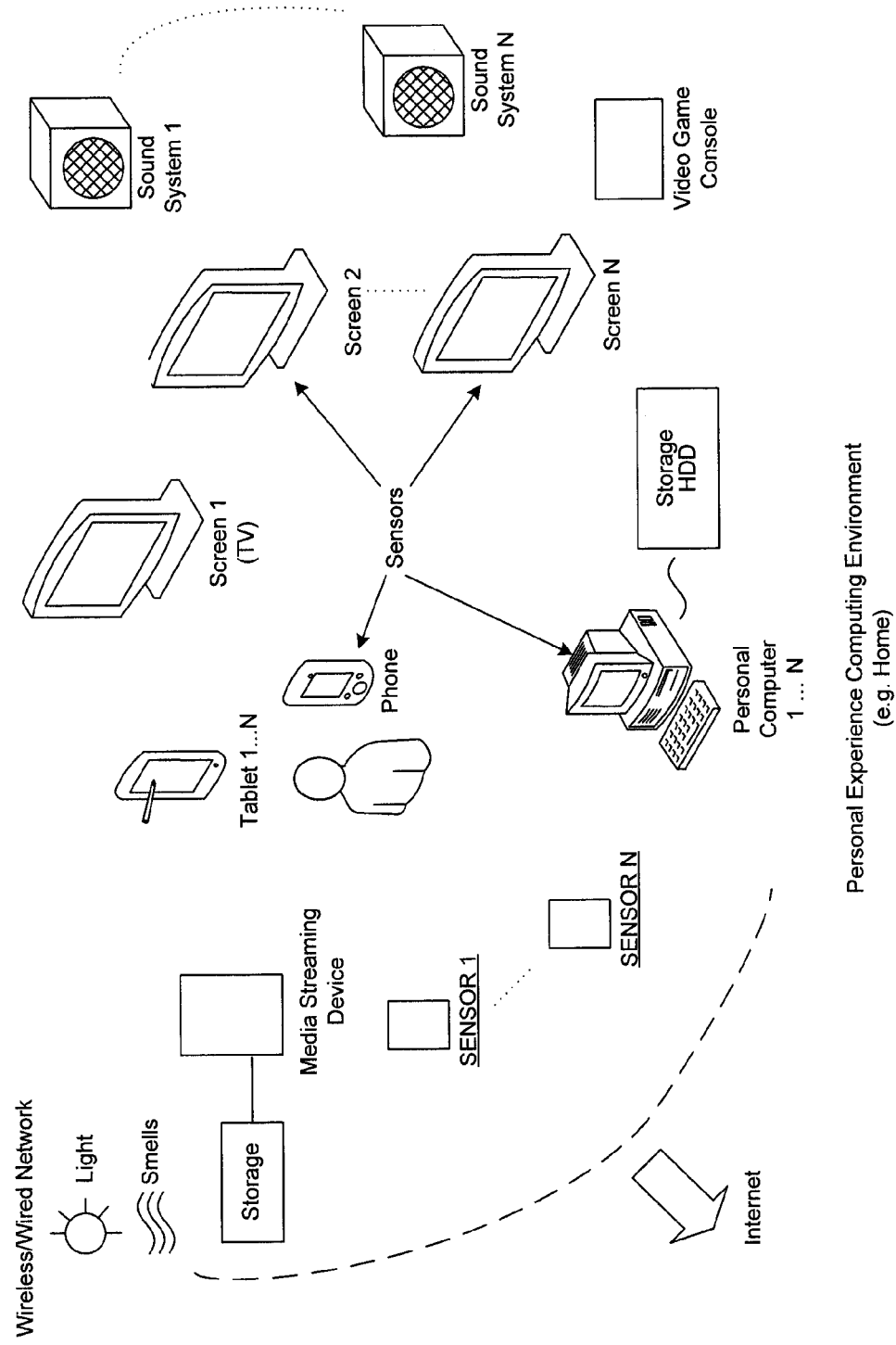
FIG. 20 illustrates an examples of a system environments that operates as a personal experience computing environment.
Figure 21:
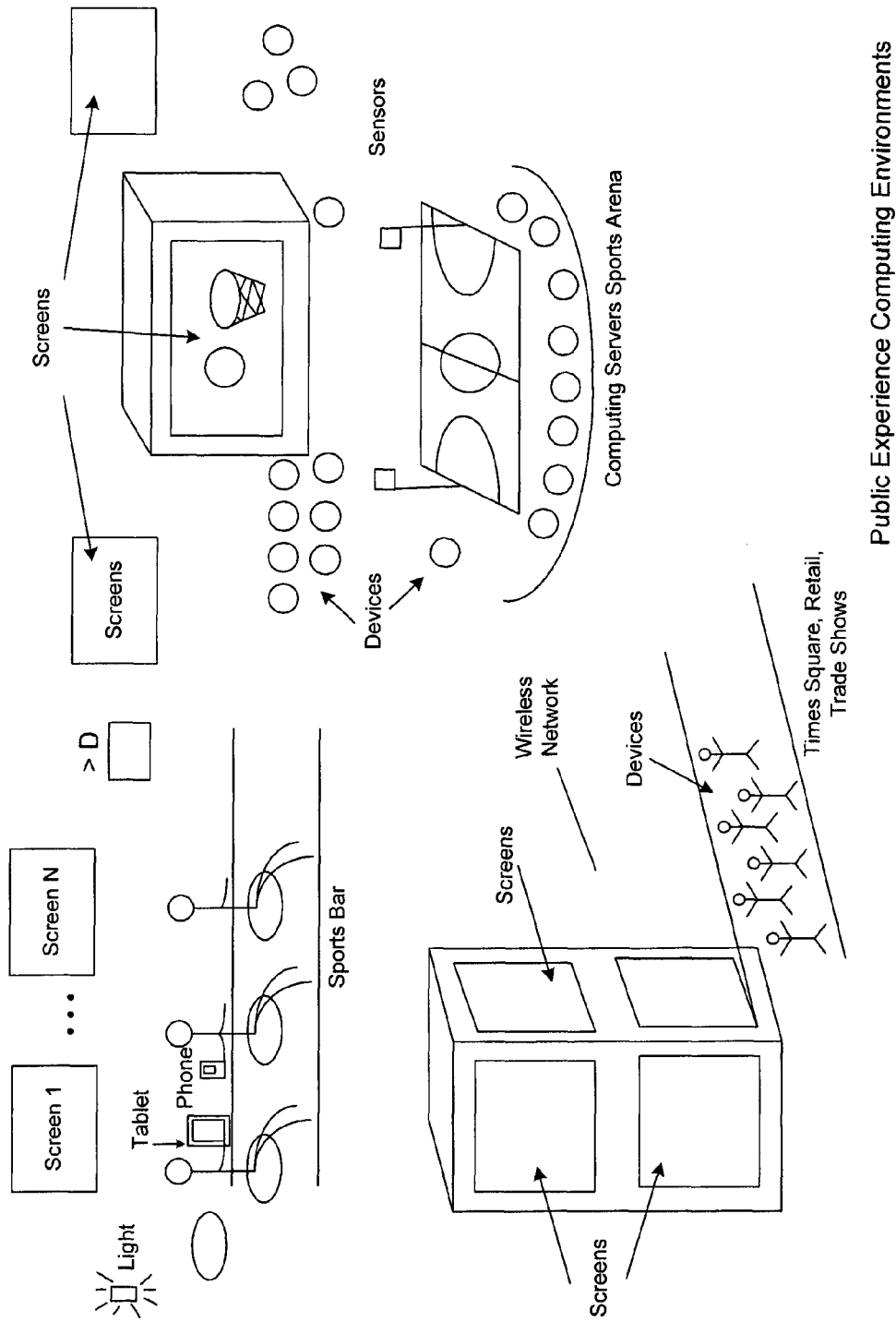
FIG. 21 illustrates an examples of a system environments that operates as a public experience computing environment.

FIGS. 20 and 21 now illustrate examples of environments that depict experience computing environments in multi-screen, multi-device, multi-sensor, multi-output type of environments with many people networked and connected through a communication network (e.g., the Internet). As illustrated, multiple pluralities of screens both large and small arranged, along with a bunch of sound systems, etc. These screens and devices connected to the environment through a bunch of sensors, including, for example, temperature sensors, accelerometer, motion tracking, video recognition sensors, etc. People frequently carry their personal devices such as a phone or a media device that frequently have a variety of sensors inbuilt, including, for example, location sensors, accelerometers, gyroscopes, microphones, etc. Additionally, other devices such as a personal computers have computing capabilities, including storage and processing power. Game consoles may have such capabilities as well. These devices are connected to the internet and the whole environment is wired by wired or wireless network. This allows multiple devices via multiple people to come and go and they can interact with each other using those public or private environments. Exemplary environments include sports bars, arena or stadiums, trade show setting in Times Square, etc., as illustrated in FIG. 21.

Figure 22:
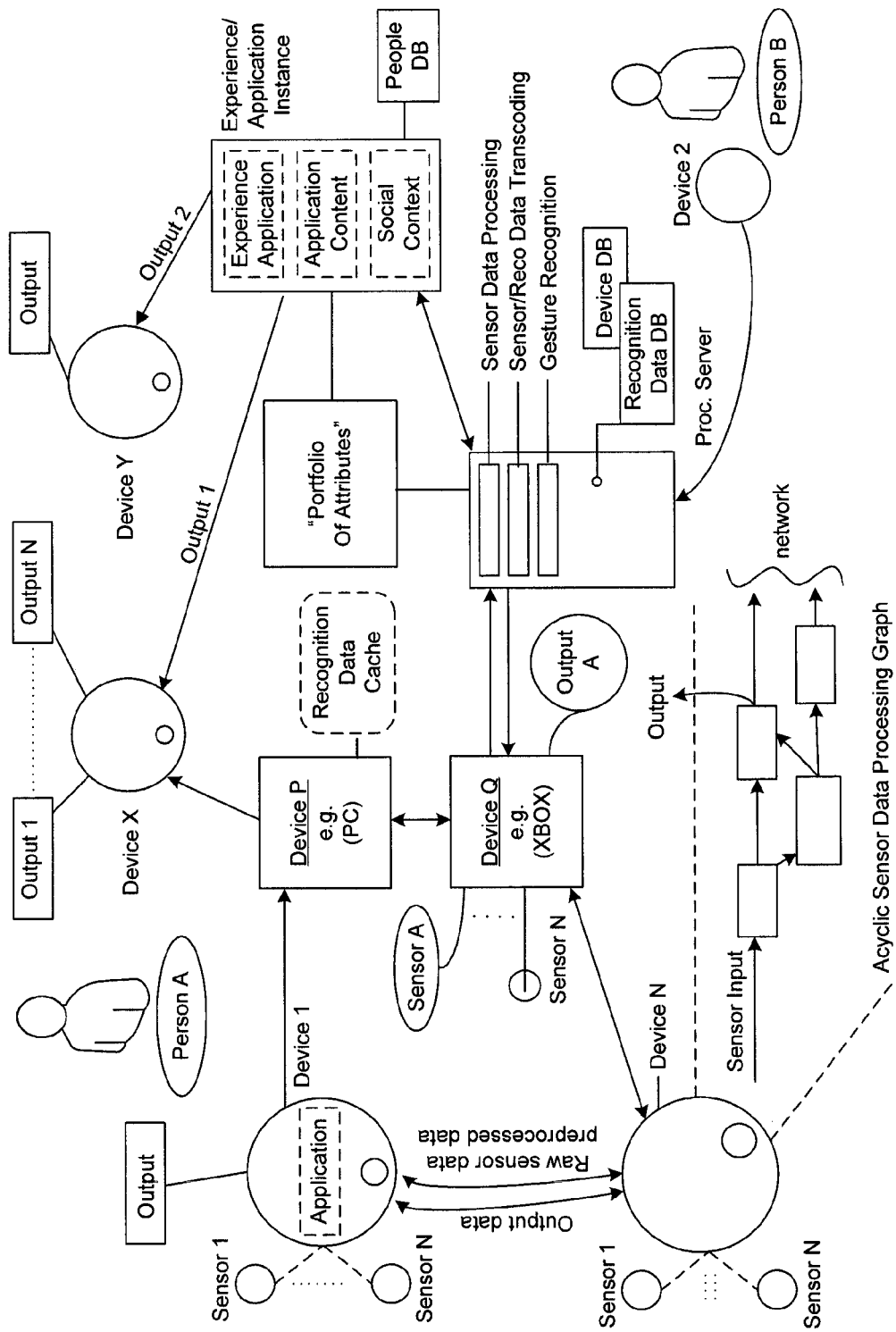
FIG. 22 illustrates a sample architecture of a distributed sensor processing system in action.

FIG. 22 illustrates a sample architecture of a distributed sensor processing system in action. Each device has a processing agent (black dot), a variety of sensors+outputs (screens, speakers, etc.). The devices exchange streams of raw sensor data, processed data, recognized data and output streams. They are processed and routed according to distributed processing graph which is updated continuously. The graph connects software processing units distributed among devices. The application generating outputs can be running on a different device displaying the outputs. In this case an output is converted to a stream and can be processed on a device. The processing graph is generated by network communication (which is outside of the scope of this patent). Some general approaches to generate and maintain this network graph include: (1) automatic server-based; (2) user-assisted (e.g. user registers devices then system builds a graph based on their I/O and CPU capabilities; (3) P2P, including building a static graph, and building a dynamic graph. In general, we assume the graph is dynamic and is based on real-time dynamic "portfolio of attributes" for each device. In embodiments, the "portfolio of attributes" is attributed to devices (but also can be users) and includes: their list of hardware components; software components (such as os and codecs and drivers); software processing components for gesture processing (SPCs); current owner; location; other sensor data; network conditions—available bandwidth, current jitter, etc. The big rectangle on the right represents a structure of a processing device—In some embodiments, this can be a remote server in the data center. Gesture processing can optionally be combined with output creation (rendering). Examples of databases assisting distributed gesture processing include: recognition data DB (as people make gestures over time it has a larger collection of patterns how people do these gestures—>improves recognition); people DB (if 90 out of 100 people in an experience applaud the effect should be more than if just 10 applaud—this effect is achieved by recombining sensor data with social data); device db maintains technical attribute of devices. Accordingly, the effect of gesture is created on the server and streamed to other output devices.

Figure 23:
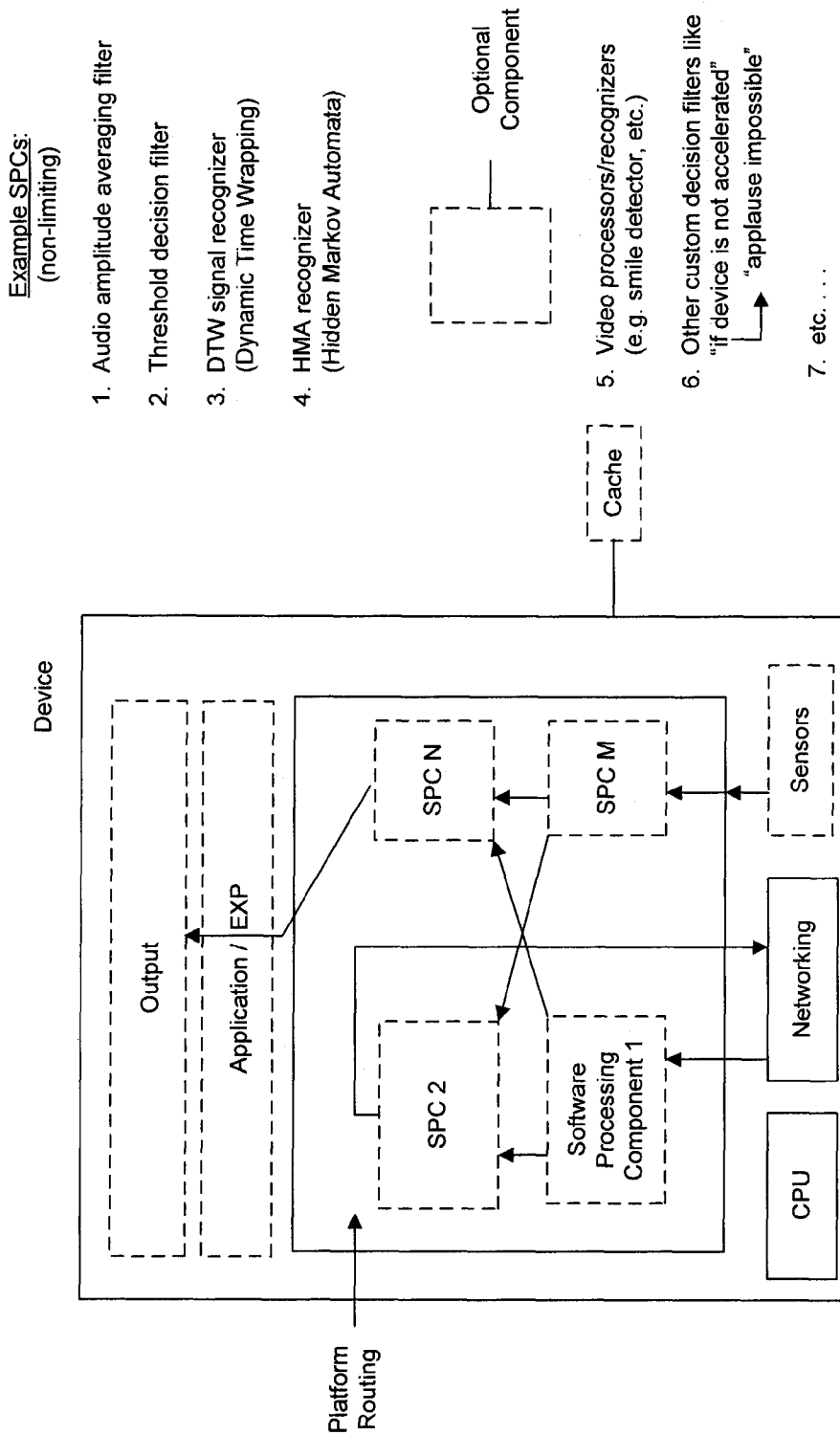
FIG. 23 illustrates an exemplary embodiment of a structure of a device agent.

FIG. 23 illustrates an exemplary embodiment of a structure of a device agent. Key components of this agent include software processing units (they are nodes in distributed processing graph); obligatory components (CPU and networking); and other optional components such as, for example, SPCs, Sensors, application rendering outputs, outputs (such as screens), etc.

Figure 24:
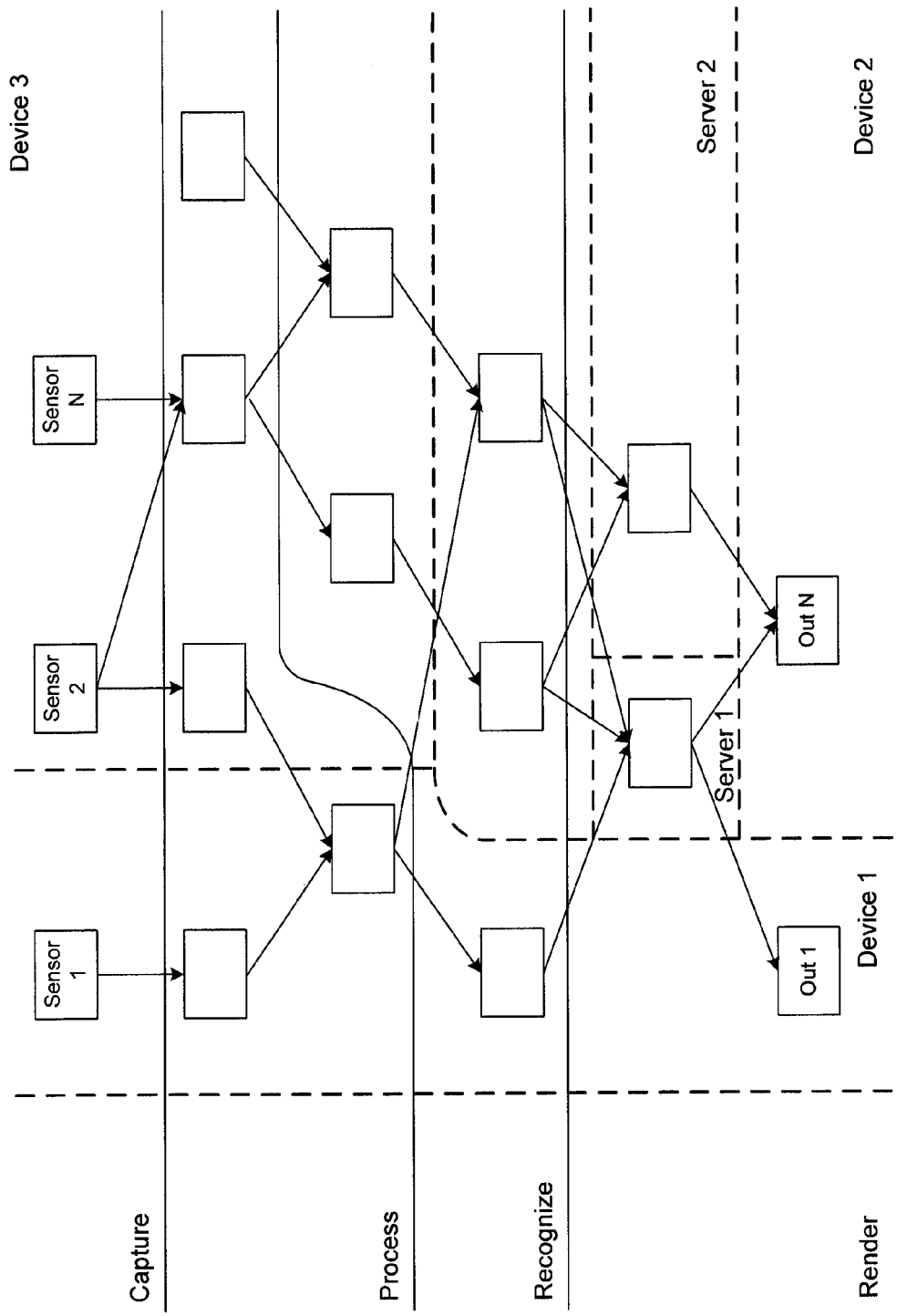
FIGS. 24-25 illustrates a distributed processing graph.
Figure 25:
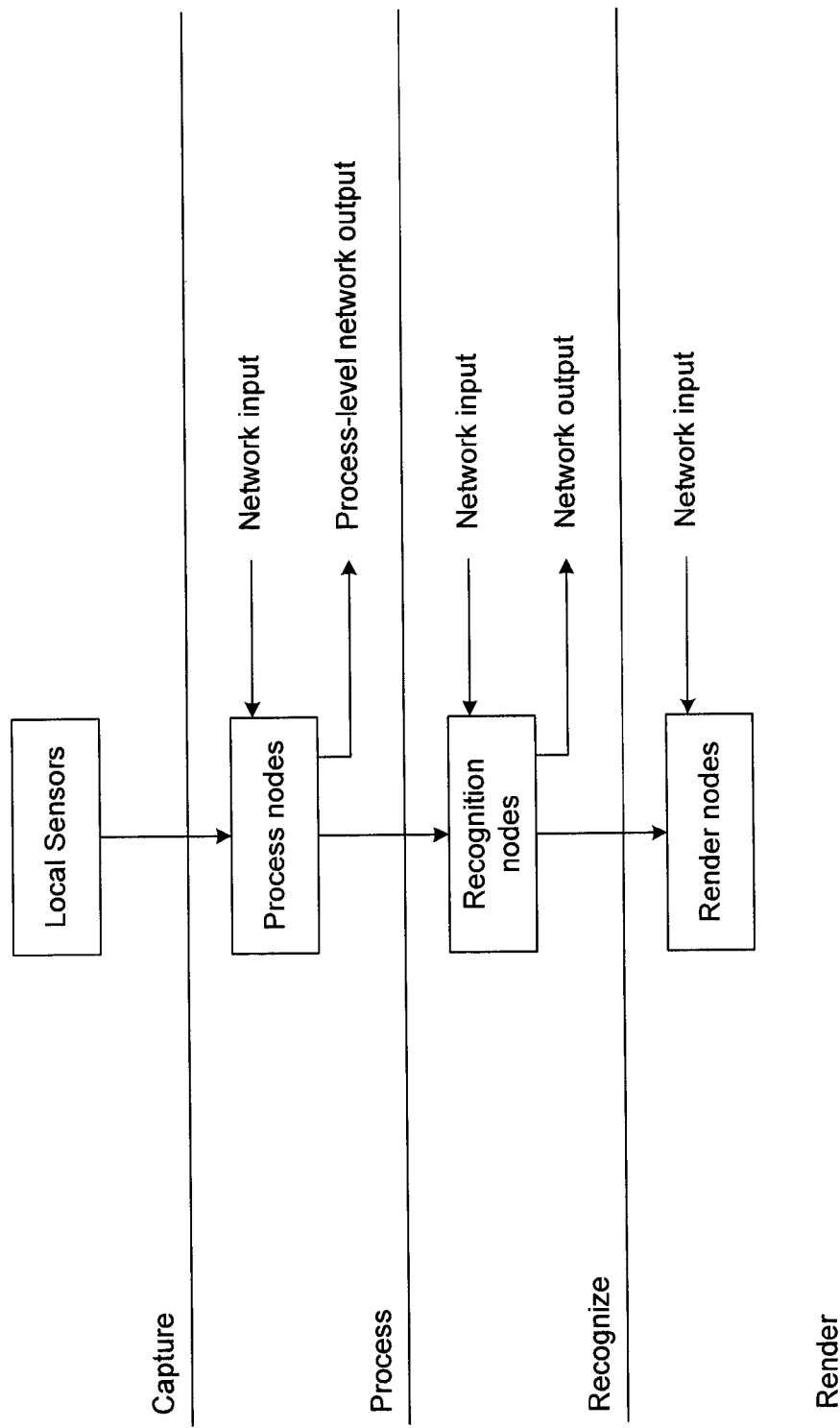

FIG. 24 illustrates a distributed processing graph: this graph connects SPCs on devices, dealing with all 4 classic stages of gesture recognition. The graph distributes capturing, processing, recognizing gestural inputs and then recombines sensor data and people data. The illustrated graph also renders outputs based on the recognized data. FIG. 25 is a similar graph from the point of view of a single device.

Figure 26:
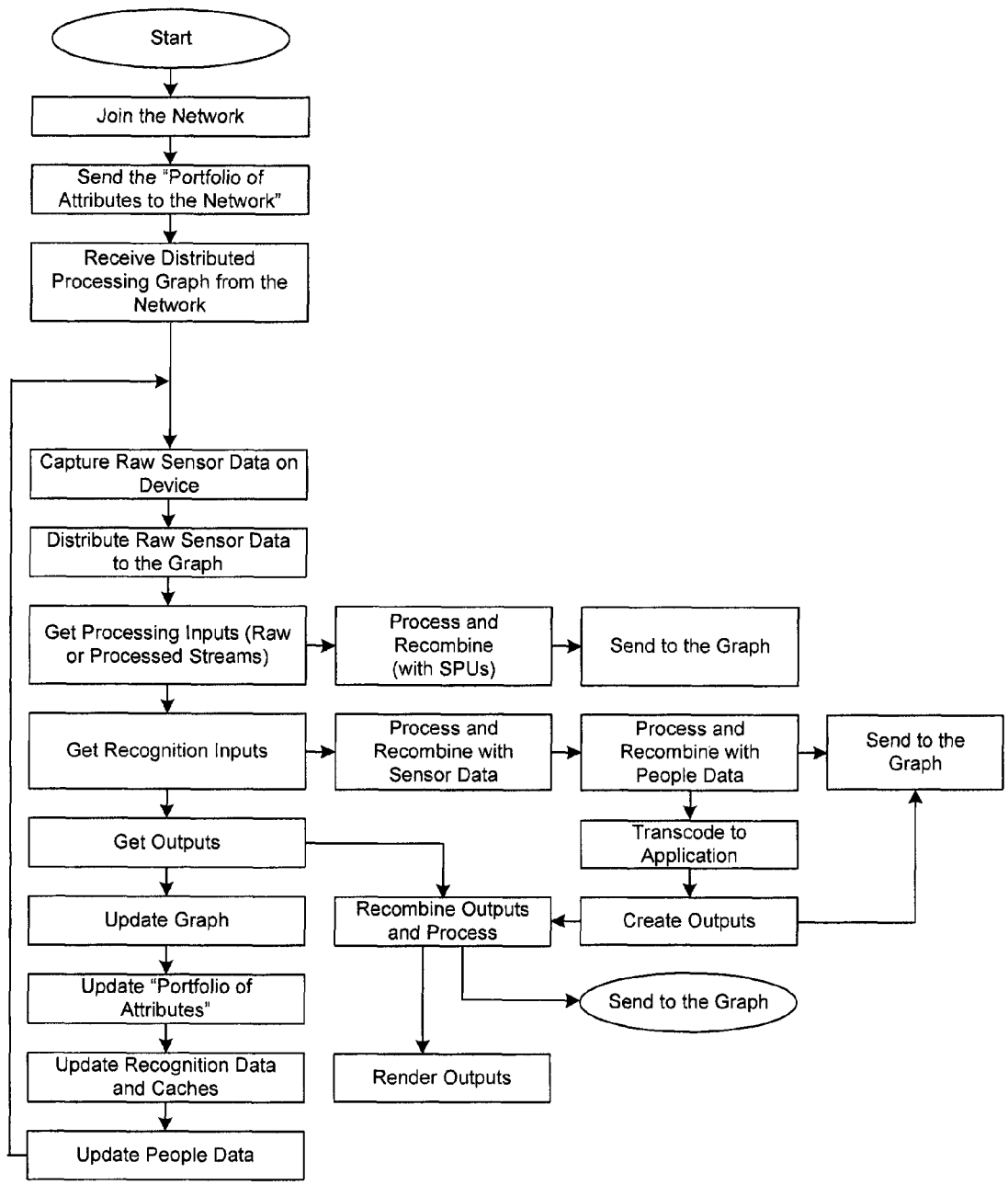
FIG. 26 now illustrates a flow diagram depicting an embodiment of an extended distributed gesture processing pipeline.

FIG. 26 now illustrates a flow diagram depicting an embodiment of an extended distributed gesture processing pipeline. The various stages involve joining the network and receiving the distributed processing graph then it runs in cycle. The process starts with capturing sensor data and sending the data to be graphed. The process checks whether there is an input for processing SPCs. If there is, then it is recombined with other sensor data, with people data and sent to graph. The process also checks whether there is input for recognition SPCs? If there is, then it is recombined with other sensor data, with people data, and then sent to graph. The process also includes an optional step after recognition to translate the recognized gesture to inputs recognized by the application that is rendering the effect of the gesture (e.g. Tron game does not understand throw gesture—>needs to be translated in a series of keystrokes, mouse clicks). The process further continues where the application creates outputs, recombines them and renders them. All critical structures are updated and then recomputed. These include: distributed processing graph; portfolio of attribute; recognition db; people db. The process then repeats as appropriate.

Figure 27:
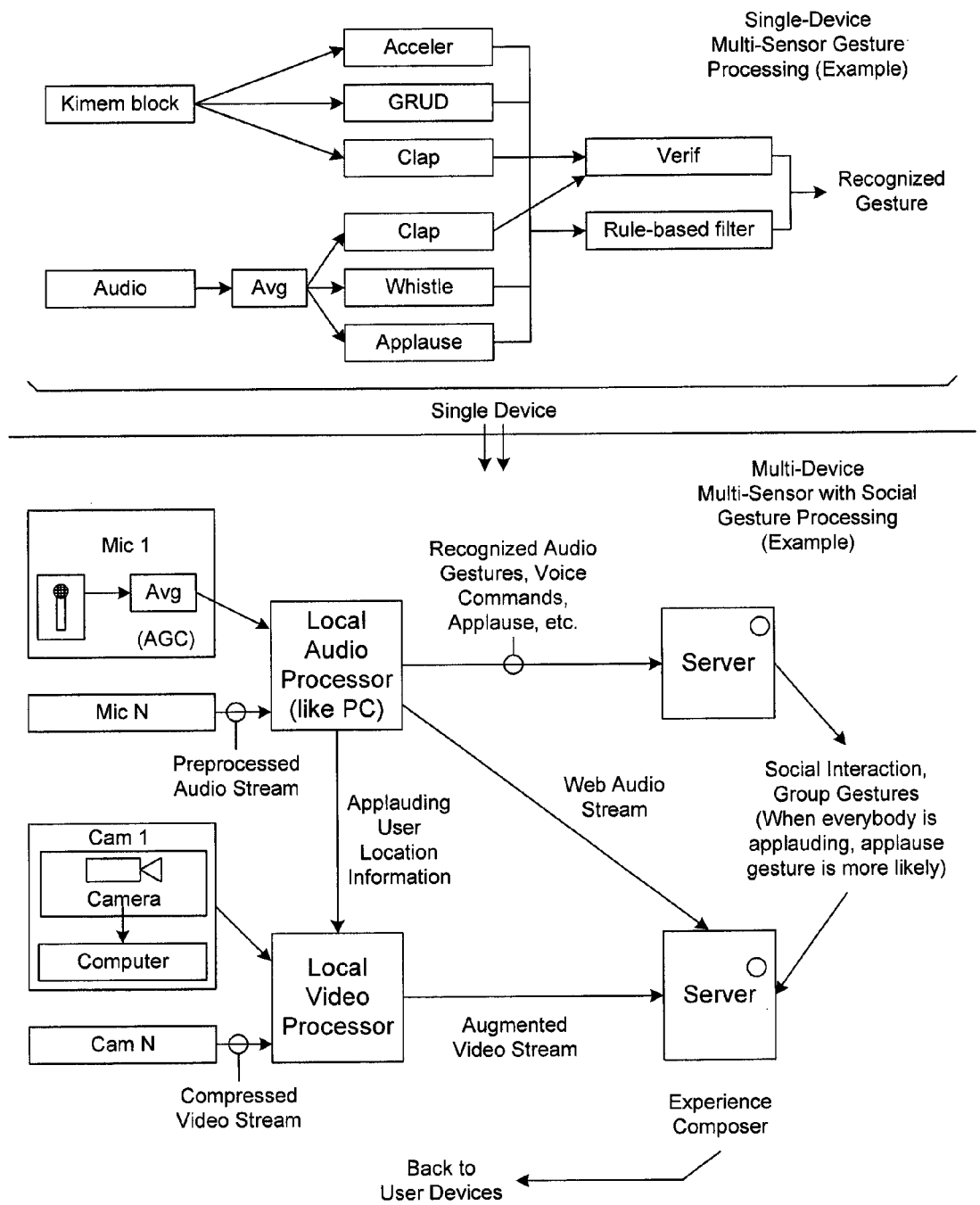
FIG. 27 illustrates an example of how a simple local device recognition system is transformed with the distributed processing system.

FIG. 27 illustrates an example of how a simple local device recognition system is transformed with the distributed processing system. The section above the device represents a recognizer based on two sensor inputs. In at least some embodiments, all stages happen locally, and all SPCs have to be present on the device. All effects and application rendering may be pre-determined on a device, in at least some instances. The section below the device illustrates a distributed system where streams of data are processed on different devices. Audio gestures (gesture+voice command) are recognized better because of the use of multiple sensor. Applause recognition, for example, is enhanced by access to social database. It is understood that recognizers benefit from recognition data DB hosted on a remote server.

Figure 28:
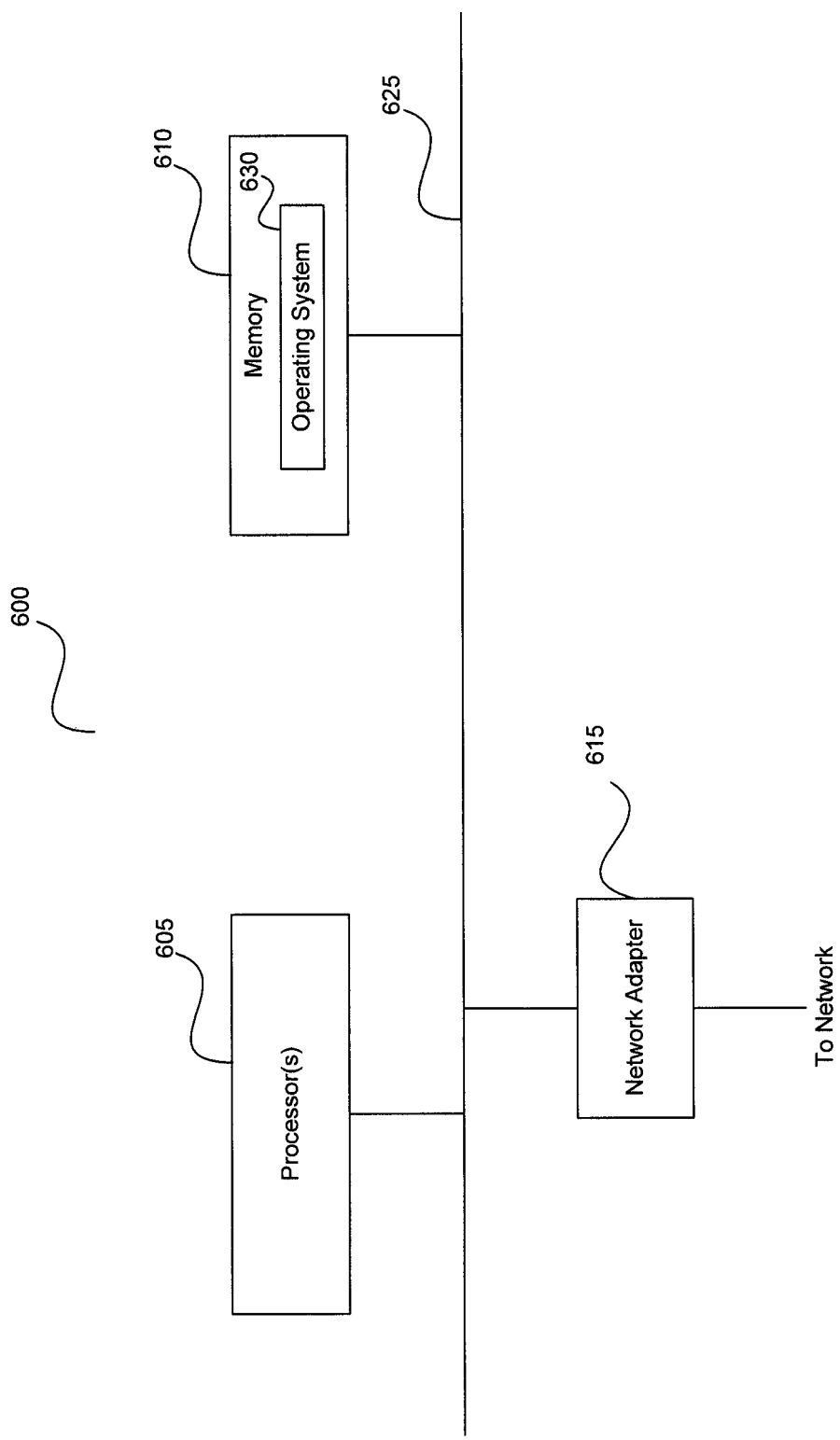
FIG. 28 is a high-level block diagram showing an example of the architecture for a computer system that can be utilized to implement the techniques discussed herein.

FIG. 28 is a high-level block diagram showing an example of the architecture for a computer system 600 that can be utilized to implement a data center, a content server, etc. In FIG. 20, the computer system 600 includes one or more processors 605 and memory 610 connected via an interconnect 625. The interconnect 625 is an abstraction that represents any one or more separate physical buses, point to point connections, or both connected by appropriate bridges, adapters, or controllers. The interconnect 625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 694 bus, sometimes referred to as "Firewire".

The processor(s) 605 may include central processing units (CPUs) to control the overall operation of, for example, the host computer. In certain embodiments, the processor(s) 605 accomplish this by executing software or firmware stored in memory 610. The processor(s) 605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 610 is or includes the main memory of the computer system 1100. The memory 610 represents any form of random access memory (RAM), read-only memory (ROM), flash memory (as discussed above), or the like, or a combination of such devices. In use, the memory 610 may contain, among other things, a set of machine instructions which, when executed by processor 605, causes the processor 605 to perform operations to implement embodiments of the present invention.

Also connected to the processor(s) 605 through the interconnect 625 is a network adapter 615. The network adapter 615 provides the computer system 600 with the ability to communicate with remote devices, such as the storage clients, and/or other storage servers, and may be, for example, an Ethernet adapter or Fiber Channel adapter.

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or sub-combinations. Also, while processes or blocks are at times shown as being performed in series, these processes or blocks may instead be performed or implemented in parallel, or may be performed at different times.

Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶ 6 will begin with the words "means for.") Accordingly, the applicant reserves the right to add additional claims after filing the application to pursue such additional claim forms for other aspects of the invention In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

The invention claimed is:

1. A computer implemented method of communicating gestures between client devices using multiple sensors, the method comprising:

receiving, by a remote server device operated as part of an experience platform, a portfolio of attributes including sensor capabilities and data processing capabilities of a plurality of client devices in communication with the remote server device via a communication network;

generating, by the remote server device, a distributed processing graph based on the received portfolio of attributes;

receiving, by the remote server device, raw sensor data from sensors of a first and a second client device of the plurality of client devices, the first client device associated with a first user, the second client device associated with a second user, the raw sensor data indicative of a physical gesture performed by the first user of the first client device, the physical gesture indicative of a request by the first user of the first client device to execute an operation at a third client device, the third client device associated with a third user, wherein the first, second, and third client devices are proximate in physical location to each other and are connected as part of an interactive experience hosted by the experience platform;

distributing, by the remote server device, the raw sensor data to the plurality of client devices based on the distributed processing graph;

receiving, by the remote server device, processed sensor data from the plurality of client devices;

recombining, by the remote server device, the processed sensor data received from the plurality of client devices;

recognizing, by the remote server device, a type of the physical gesture performed by the first user based on the recombined processed sensor data;

interpreting, by the remote server device, the operation to be executed at the third client device based on the type of physical gesture performed by the first user; and transmitting, by the remote server device, a command signal configured to cause an application at the third client device to execute the operation.

2. The method of claim 1, wherein the third client device is located within a visual proximity of the first client device.

3. The method of claim 1, wherein the sensors include one or more of:

a camera;

a microphone;

a gyrometer;

a motion sensor;

a temperature sensor;

a pressure sensor; and an accelerometer.

4. The method of claim 1, wherein the physical gesture is one or more of:

a facial expression of the first user;

a movement of the first client device in a particular manner by the first user;

a vocal expression of the first user;

an accelerated movement of the first client device by the first user; or an application of sensory or tactile pressure by the first user.

5. The method of claim 1, wherein the communication network operates in association with a cloud computing environment, the remote server device instantiated within the cloud computing environment that is physically remote to the first, second, and third client devices.

6. The method of claim 1, wherein the first, second, and third client devices are connected as members of a social networking platform at the time the remote server device receives the raw sensor data.

7. The method of claim 1, wherein the processed sensor data indicates, in addition to the physical gesture, a magnitude of assertion of the physical gesture.

8. The method of claim 7, wherein, upon receipt of the processed sensor data, the remote server device further interprets additional parameters for execution of the operation based on the indication of the magnitude of assertion of the physical gesture.

9. The method of claim 1, wherein the raw sensor data includes indicia of a plurality of physical gestures performed by the first user.

10. The method of claim 9, wherein each of the plurality of physical gestures performed by the first user characterize different parameters associated with a particular operation to be executed on the third client device.

11. The method of claim 1, further comprising:
transmitting, by the remote server device, a command signal configured to cause an application at a fourth client device to execute an operation;
wherein the fourth client device is associated with a fourth user and is remote in physical location to the third client device;
wherein the fourth client device is within visual proximity to another user;
wherein the command signal configured to cause the application at the fourth client device to execute the operation is transmitted using a low latency network protocol; and
wherein the execution of the operation at the fourth client device is substantially synchronized with the execution of the operation at the third client device.

12. The method of claim 1, further comprising:
receiving, by the remote server device, a signal from the first client device indicating a presence of the second client device within a proximity of the first client device.

13. The method of claim 1, further comprising:
incorporating, by the remote server device, the processed sensor data from at least two types of sensors;
wherein at least one of the at least two types of sensors is an optical sensor;
wherein the processed sensor data includes a visual capture of the first user of the first client device; and
interpreting, by the remote server device, a facial or bodily expression of the first user based on the incorporated processed sensor data.

14. A server device operated as part of an experience platform, the server device comprising:
one or more processors;
a network adapter through which to communicate with a plurality of client devices via a communication network;
a memory device coupled to the network adapter and configured to store computer code, which when executed by the one or more processors, cause the server device to:
receive a portfolio of attributes including sensor capabilities and data processing capabilities of the plurality of client devices;
generate a distributed processing graph based on the received portfolio of attributes;
receive raw sensor data from sensors associated with a first and a second client device of the plurality of client devices, the first client device associated with a first user, the second client device associated with a second user, the raw sensor data indicative of a physical gesture performed by the first user of the first client device, the physical gesture indicative of a request by the first user of the first client device to execute an operation at a third client device, the third client device associated with a third user, wherein the first, second, and third client devices are proximate in physical location to each other and are connected as part of an interactive experience hosted by the experience platform;
distribute the raw sensor data to the plurality of client devices based on the distributed processing graph;
receive processed sensor data from at least one of the plurality of client devices;
recombine the processed sensor data received from the at least one of the plurality of client devices;
recognize a type of the physical gesture performed by the first user based on the recombined processed sensor data;
interpret the operation to be executed at the third client device based on the type of physical gesture performed by the first user; and
transmit a command signal configured to cause an application at the third client device to execute the operation.

15. The server device of claim 14, wherein the third client device is located within a visual proximity of the first client device.

16. The server device of claim 14, wherein the sensors include one or more of:
a camera;
a microphone;
a gyrometer;
a motion sensor;
a temperature sensor;
a pressure sensor; and
an accelerometer.

17. The server device of claim 14, wherein the physical gesture is one or more of:
a facial expression of the first user;
a movement of the first client device in a particular manner by the first user;
a vocal expression of the first user;
an accelerated movement of the first client device by the first user; or
an application of sensory or tactile pressure by the first user.

18. The server device of claim 14, wherein the communication network operates in association with a cloud computing environment, the server device instantiated within the cloud computing environment that is physically remote to the first, second, and third client devices.

19. The server device of claim 14, wherein the first, second, and third client devices are connected as members of a social networking platform at the time the server device receives the raw sensor data.

20. The server device of claim 14, wherein the processed sensor data indicates, in addition to the physical gesture, a magnitude of assertion of the physical gesture.

21. The server device of claim 20, wherein, upon receipt of the processed sensor data, the server device further interprets additional parameters for execution of the operation based on the indication of the magnitude of assertion of the physical gesture.

22. The server device of claim 14, wherein the raw sensor data includes indicia of a plurality of physical gestures performed by the first user.

23. The server device of claim 22, wherein each of the plurality of physical gestures performed by the first user characterize different parameters associated with a particular operation to be executed on the third client device.

24. The server device of claim 14, wherein the memory device is further configured to store additional computer code, which when executed by the one or more processors, cause the server device to further:
transmit a command signal configured to cause an application at a fourth client device to execute an operation;

wherein the fourth client device is associated with a fourth user and is remote in physical location to the third client device;

wherein the fourth client device is within visual proximity to another user;

wherein, the command signal configured to cause the application at the fourth client device to execute the operation is transmitted using a low latency network protocol; and wherein the execution of the operation at the fourth client device is substantially synchronized with the execution of the operation at the third client device.

25. The server device of claim 14, wherein the memory device is further configured to store additional computer code, which when executed by the one or more processors, cause the server device to further:

receive a signal from the first client device indicating a presence of the second client device within a proximity of the first client device.

26. The server device of claim 14, wherein the memory device is further configured to store additional computer code, which when executed by the one or more processors, cause the server device to further:

incorporate the processed sensor data from at least two types of sensors;

wherein, at least one of the at least two types of sensors is an optical sensor;

wherein, the processed sensor data includes a visual capture of the first user of the first client device; and interpret a facial or bodily expression of the first user based on the incorporated processed sensor data.

27. A system operated as part of an experience platform for communicating gestures between client devices, the system comprising:

means for receiving a portfolio of attributes including sensor capabilities and data processing capabilities of a plurality of client devices in communication with the system via a communication network;

means for generating a distributed processing graph based on the received portfolio of attributes;

means for receiving raw sensor data from sensors associated with a first and a second client device of the plurality of client devices, the first client device associated with a first user, the second client device associated with a second user, the raw sensor data indicative of a physical gesture performed by the first user of the first client device, the physical gesture indicative of a request by the first user of the first client device to execute an operation at a third client device, the third client device associated with a third user, wherein the first, second, and third client devices are proximate in physical location to each other and are connected as part of an interactive experience hosted by the experience platform;

means for distributing the raw sensor data to the plurality of client devices based on the distributed processing graph;

means for receiving processed sensor data from the plurality of client devices;

means for recombining the processed sensor data received from the plurality of client devices;

means for recognizing the type of physical gesture performed by the first user based on the recombined processed sensor data;

means for interpreting the operation to be executed at the third client device based on the type of physical gesture performed by the first user; and means for transmitting a command signal configured to cause an application at the third client device to execute the operation.

28. The system of claim 27, further comprising:

means for receiving a signal from the first client device indicating a presence of the second client device within a proximity of the first client device.

29. The system of claim 27, further comprising:

means for transmitting a command signal configured to cause an application at a fourth client device to execute an operation;

wherein the fourth client device is associated with a fourth user and is remote in physical location to the third client device;

wherein the fourth client device is within visual proximity to another user; and wherein the execution of the operation at the fourth client device is substantially synchronized with the execution of the operation at the third client device.

* * * * *